May 17, 1932.   C. DOERING ET AL   1,858,540
WRAPPING MACHINE
Filed Nov. 28, 1928   19 Sheets-Sheet 1
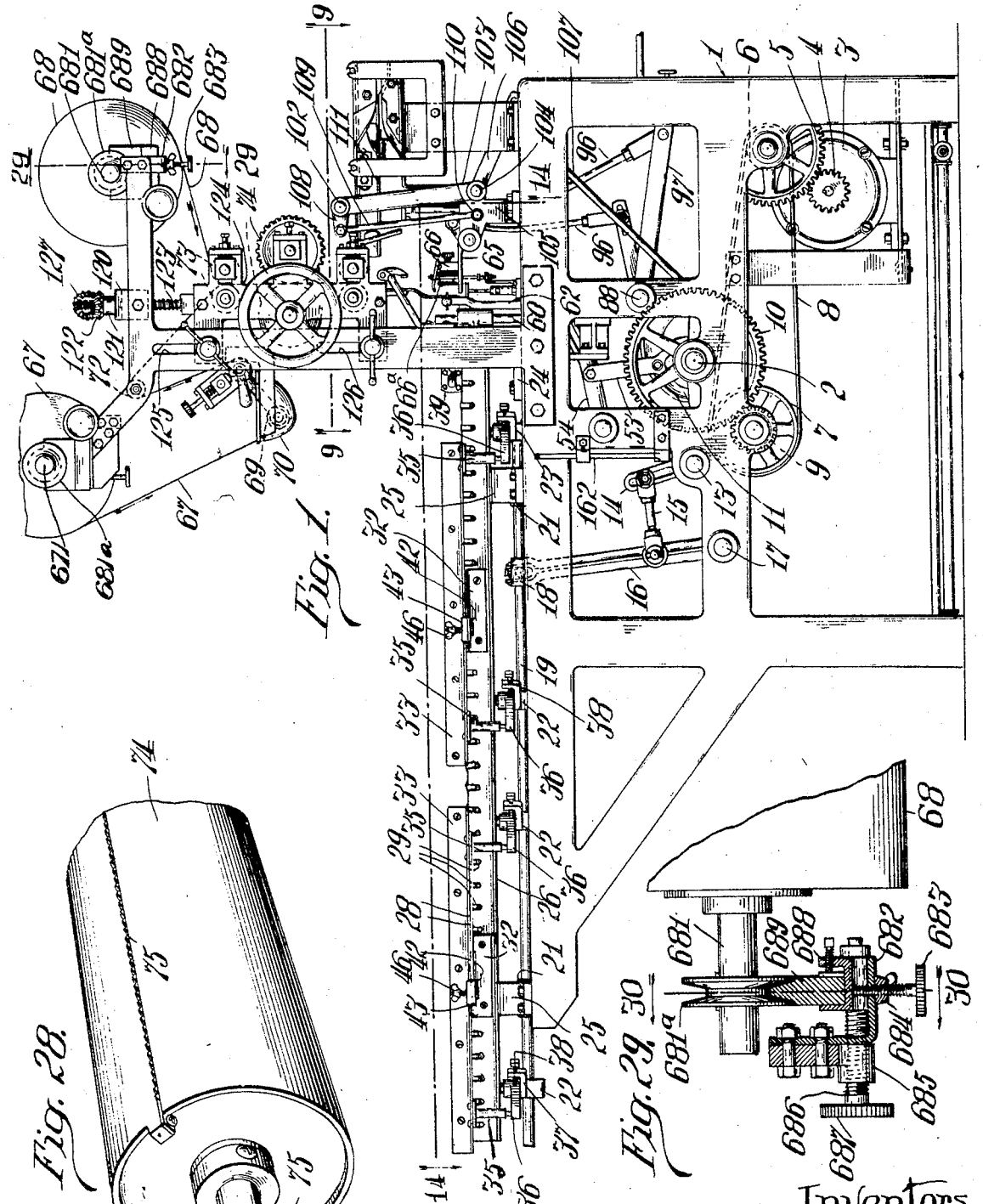
Inventors
Charles and Henry H. Doering
George Alstad
and Bertel Skoglund
By Rudolph Ury
Attorney

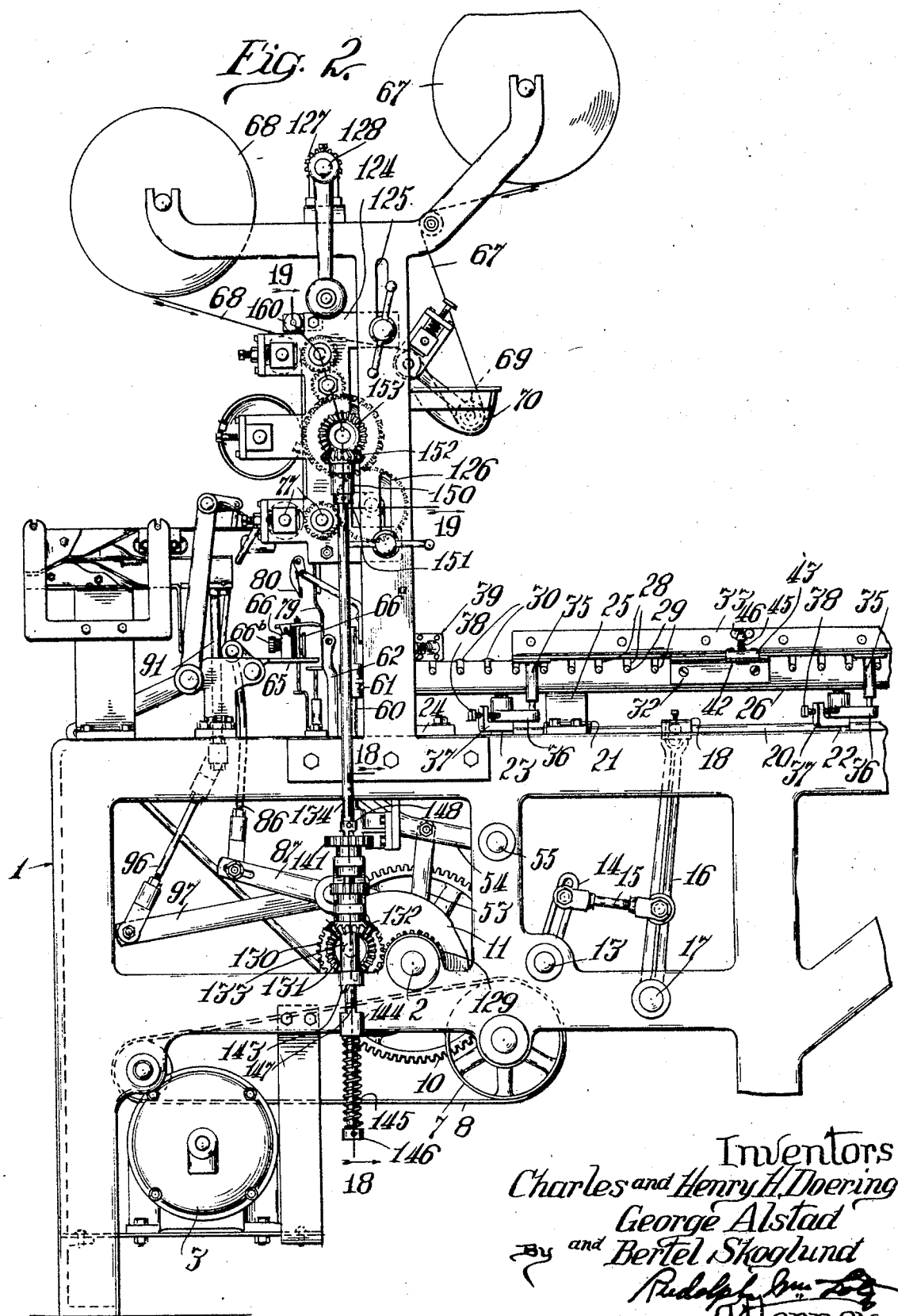

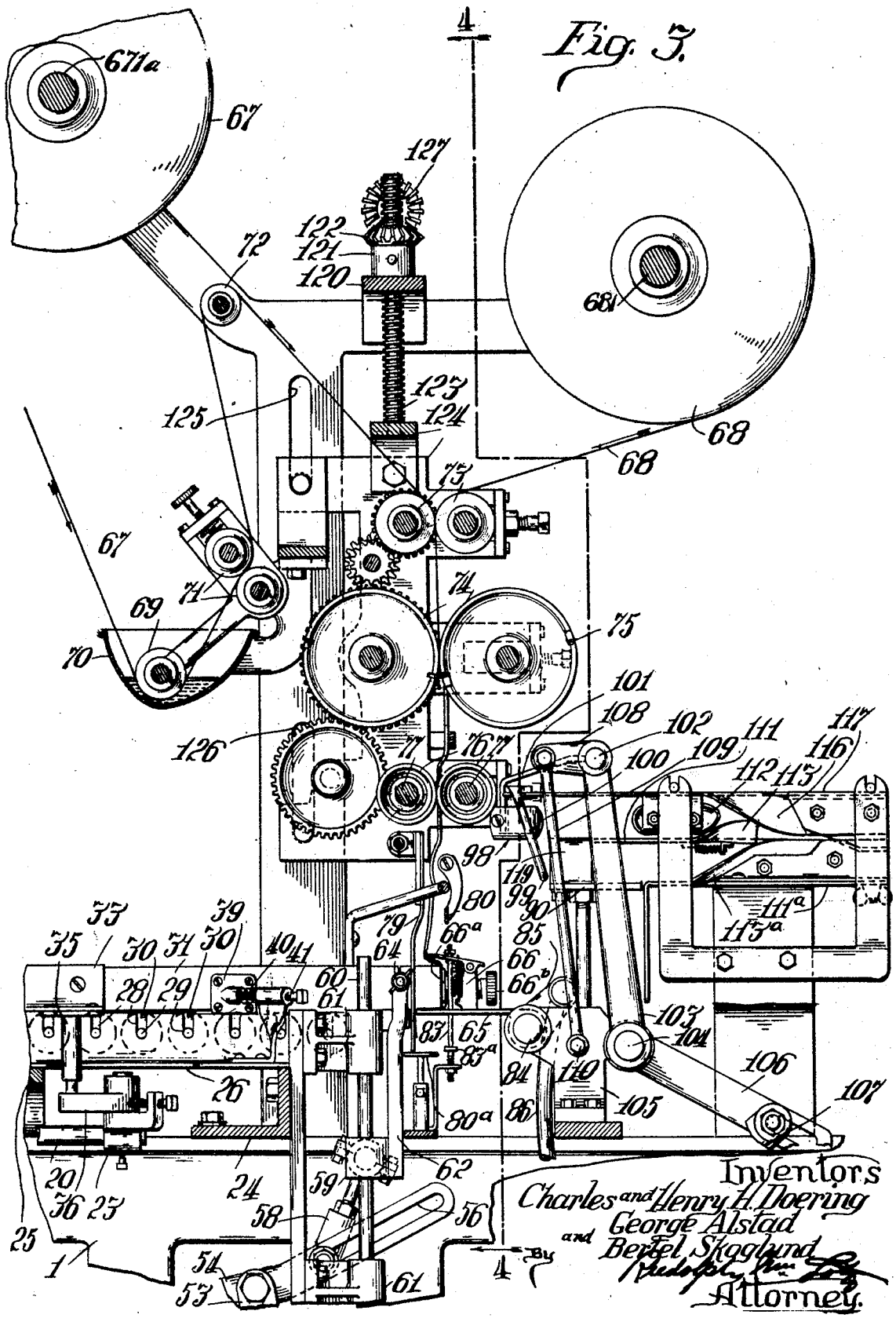

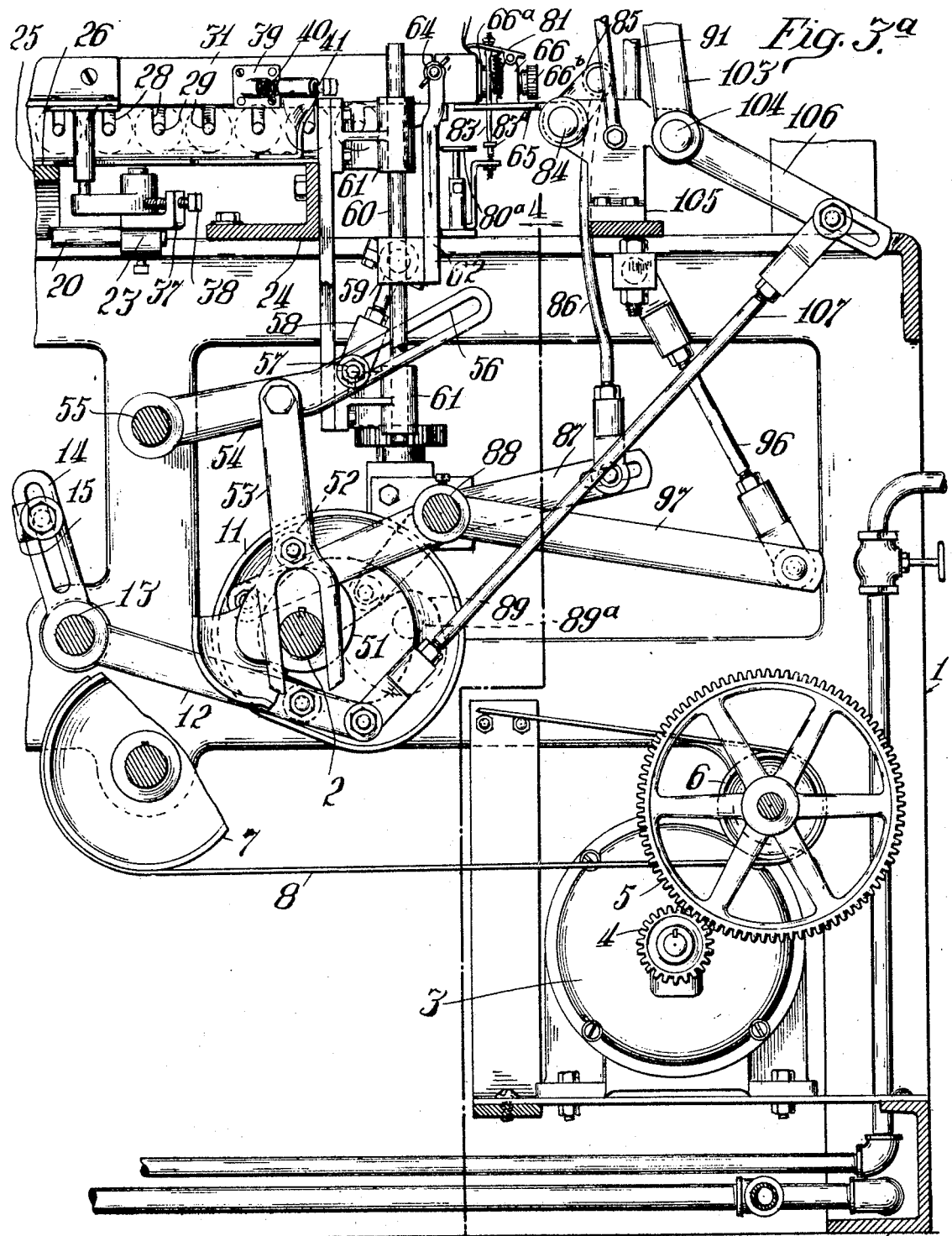

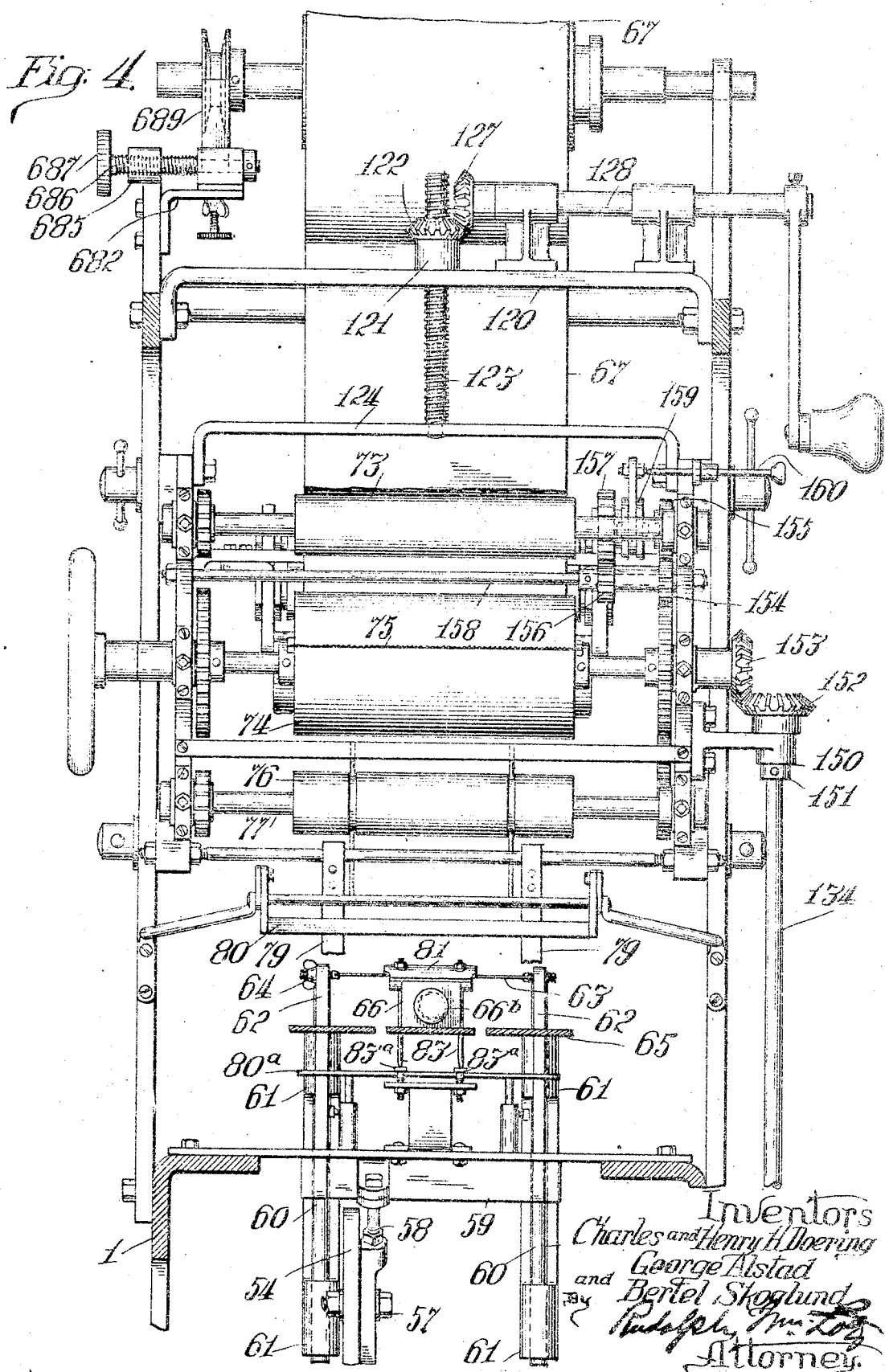

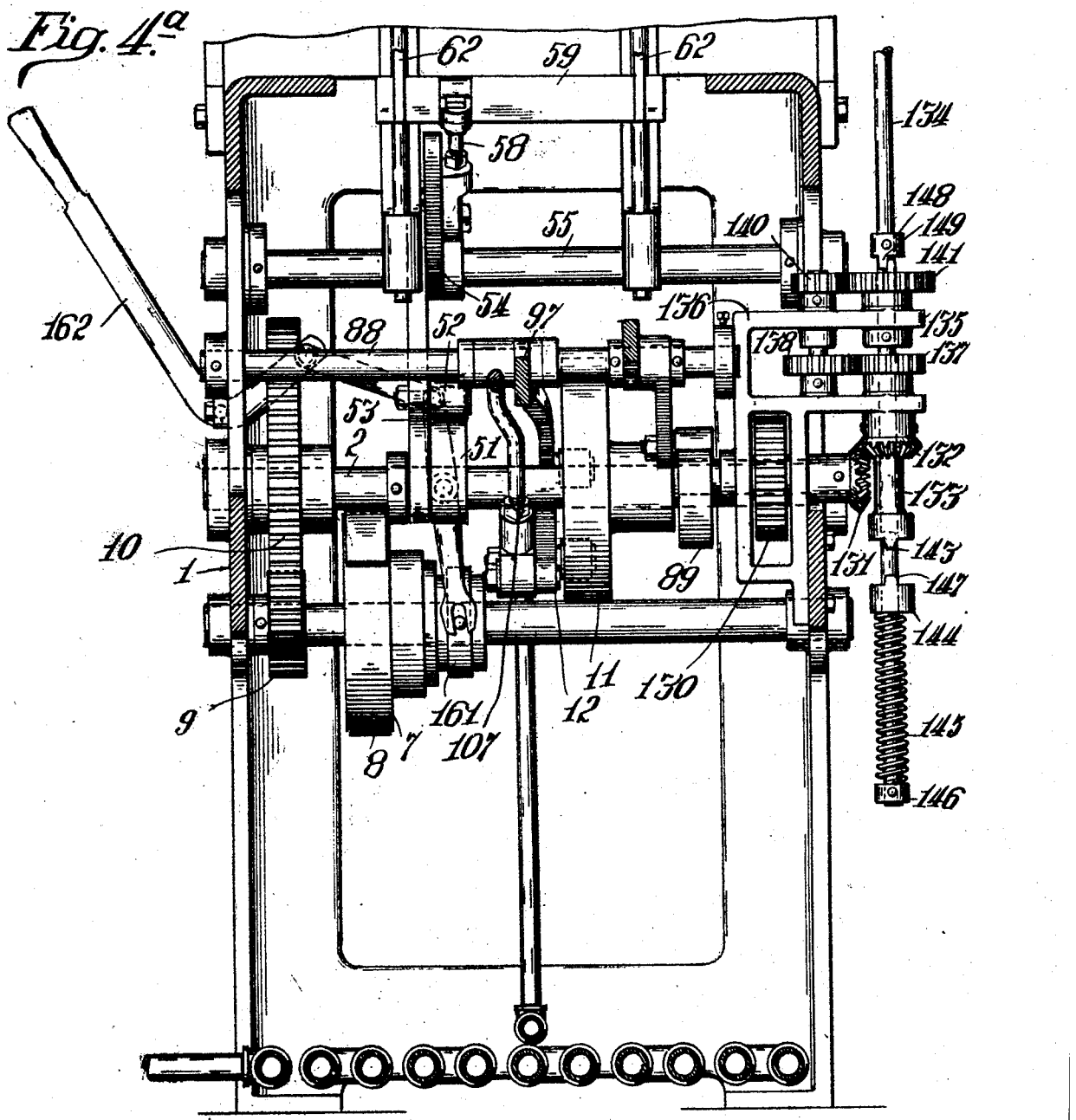

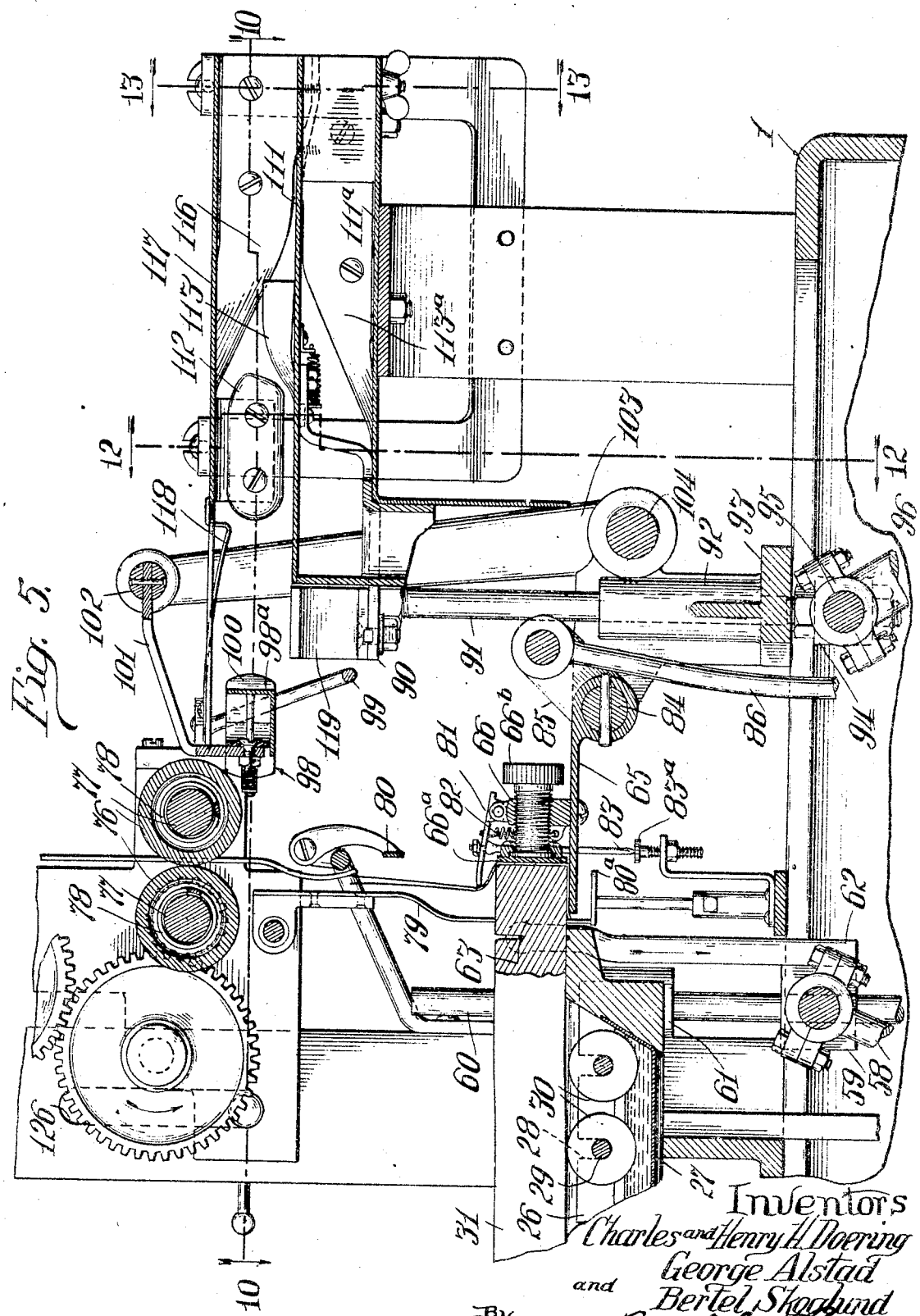

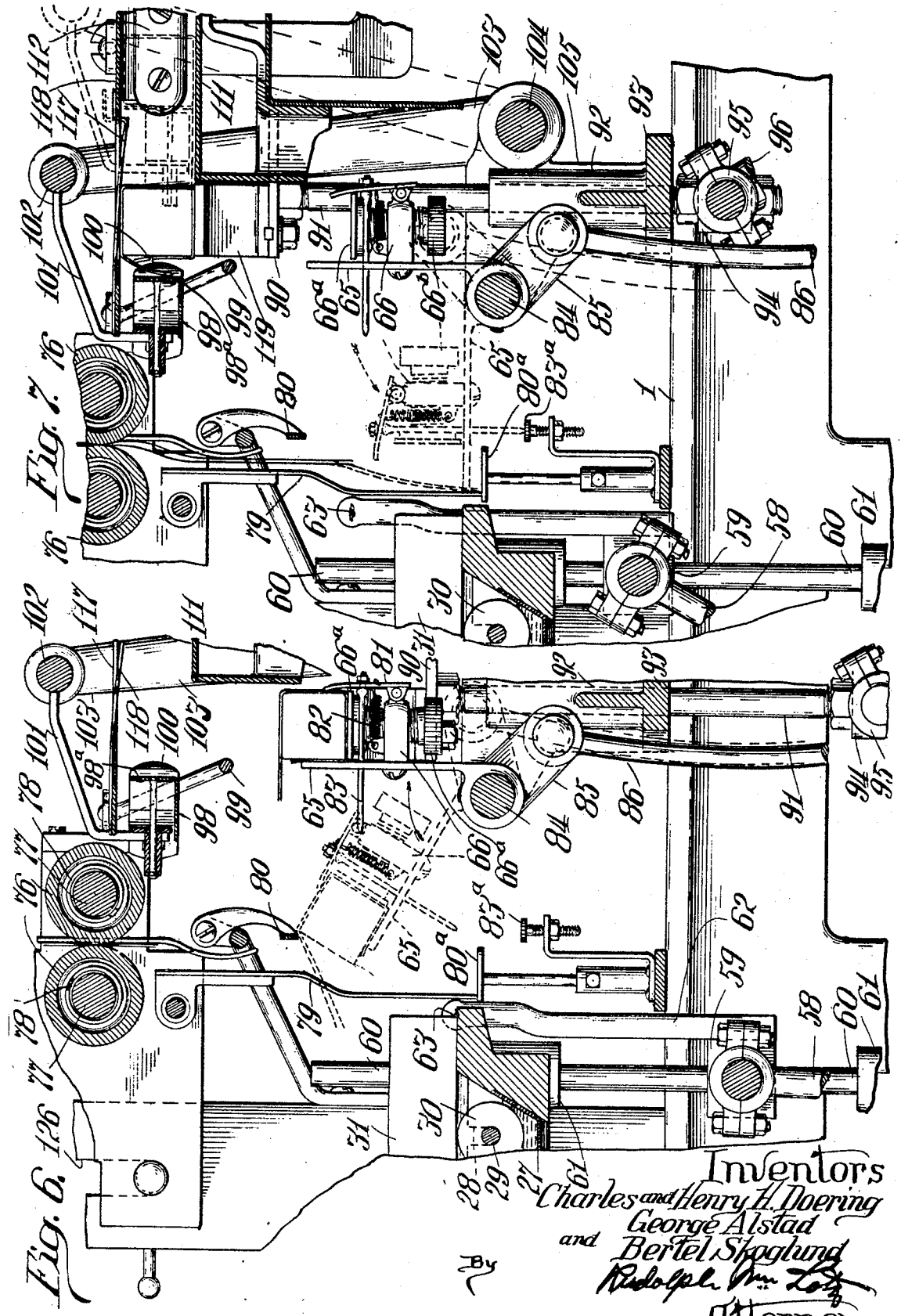

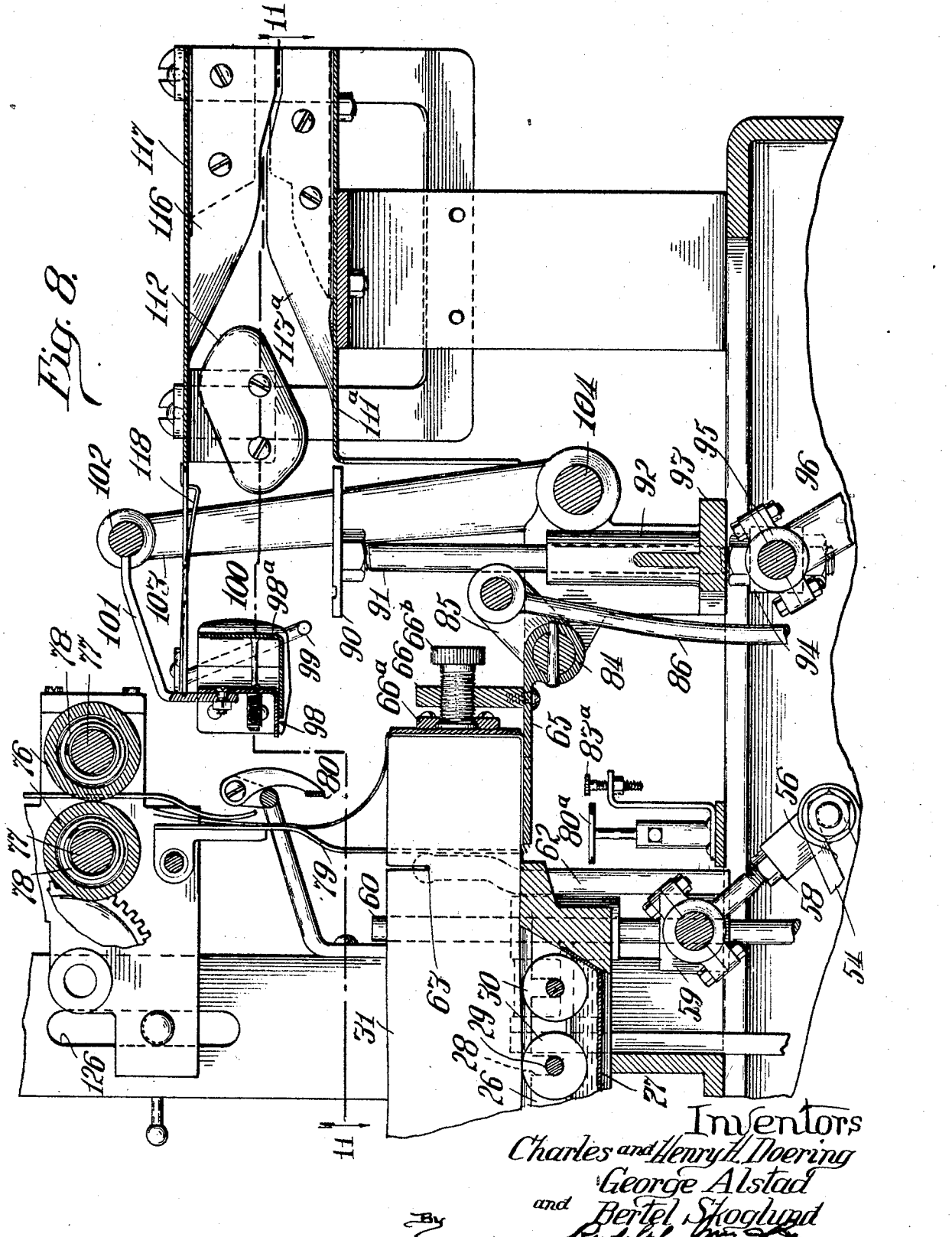

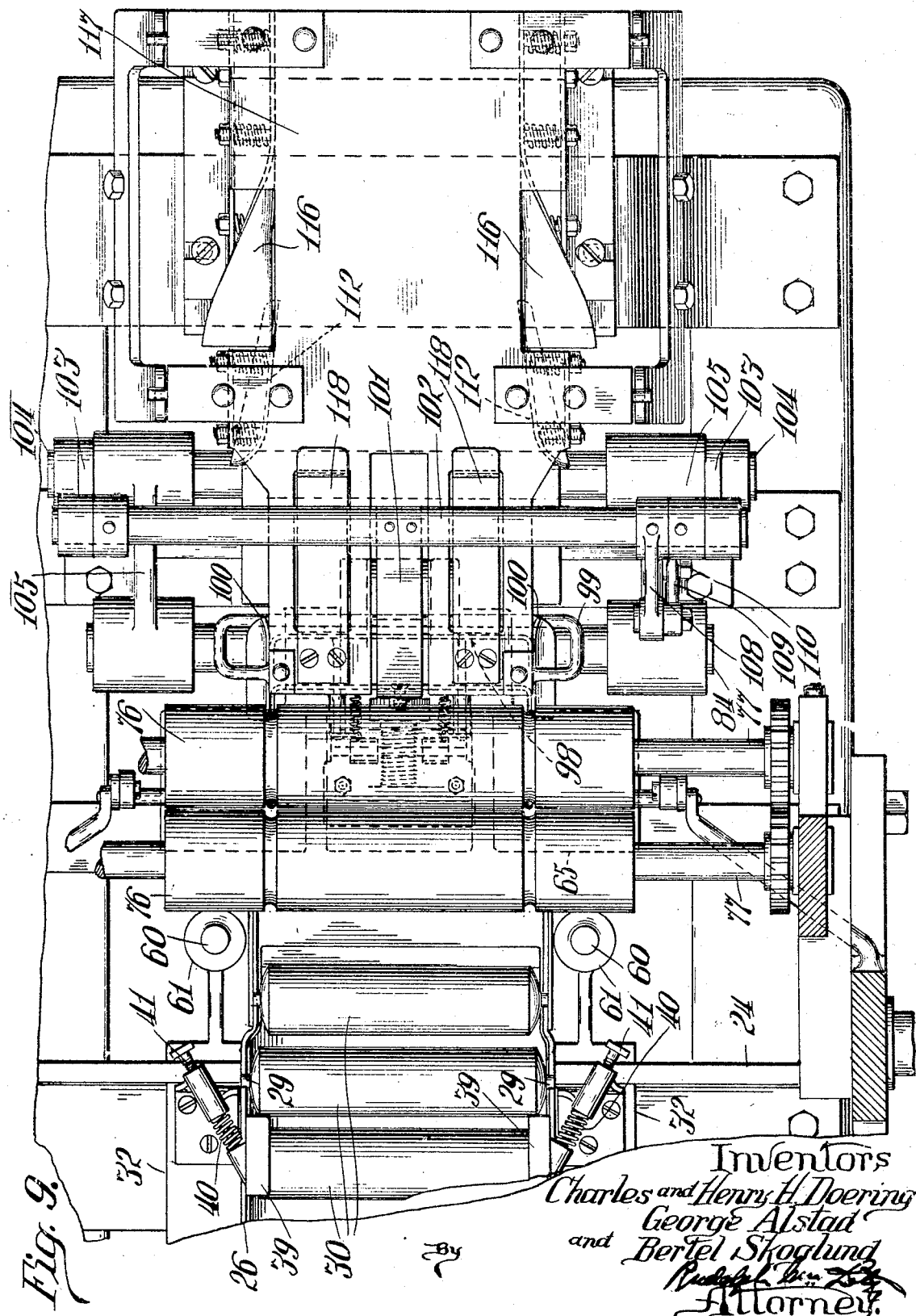

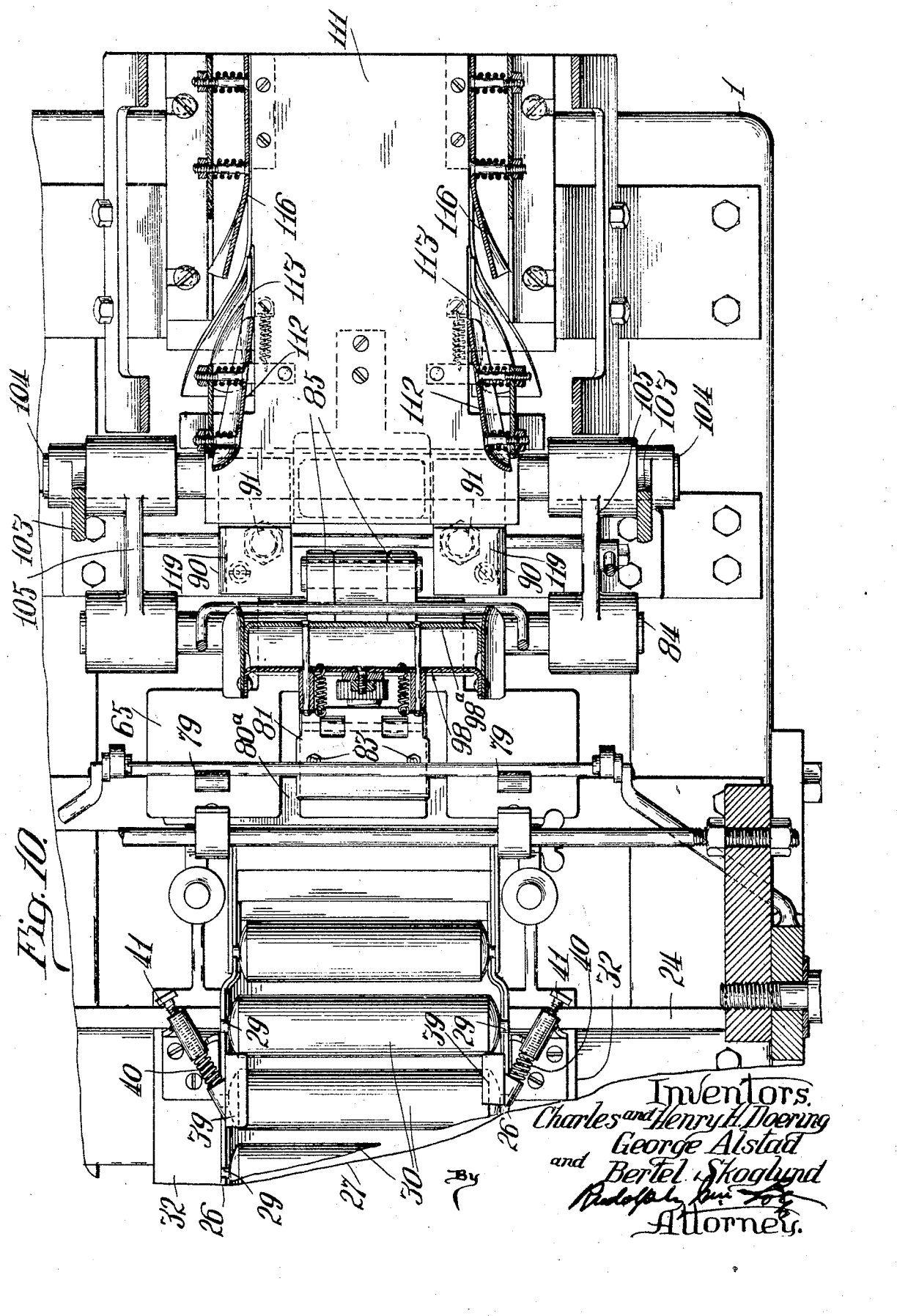

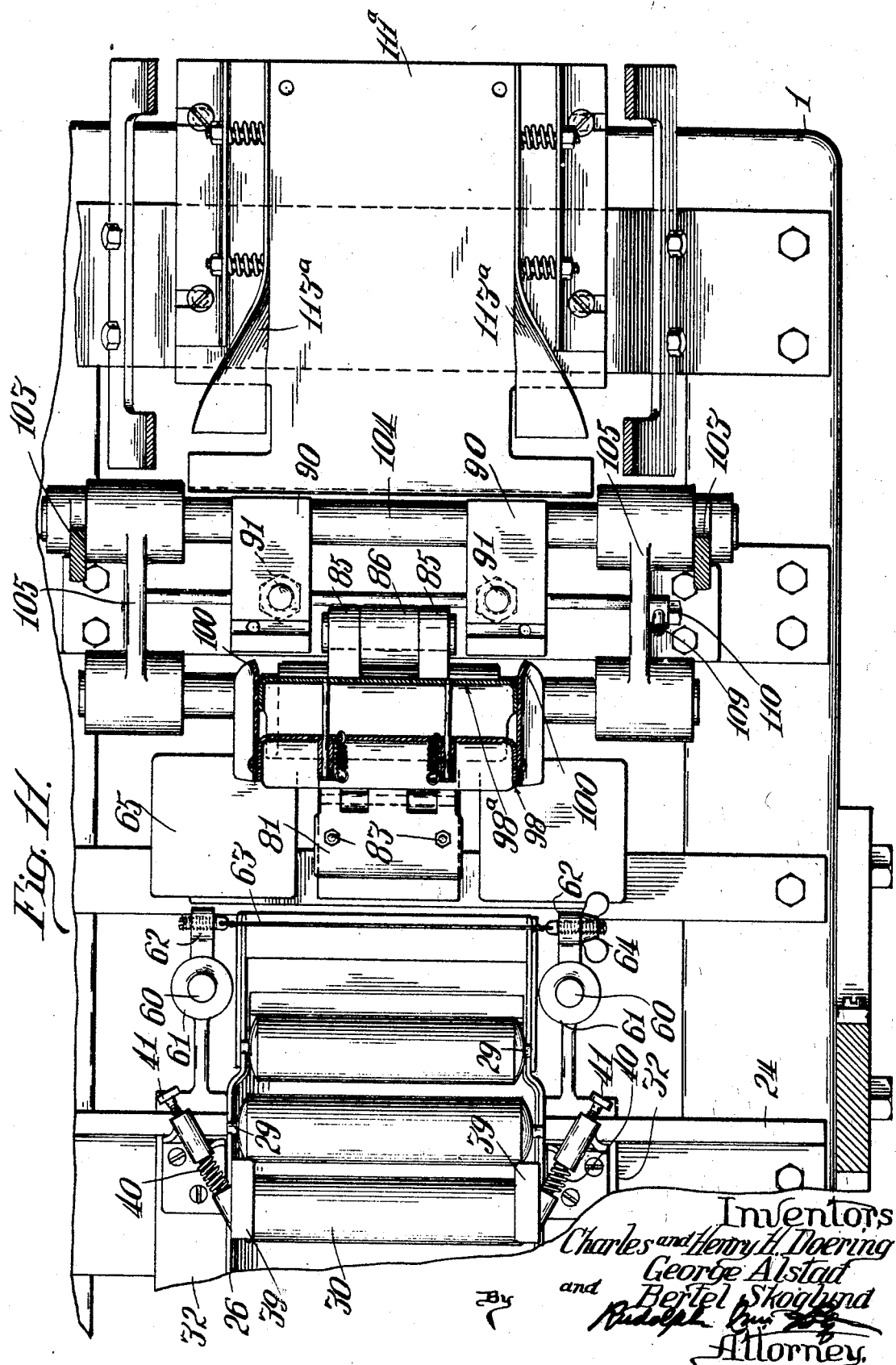

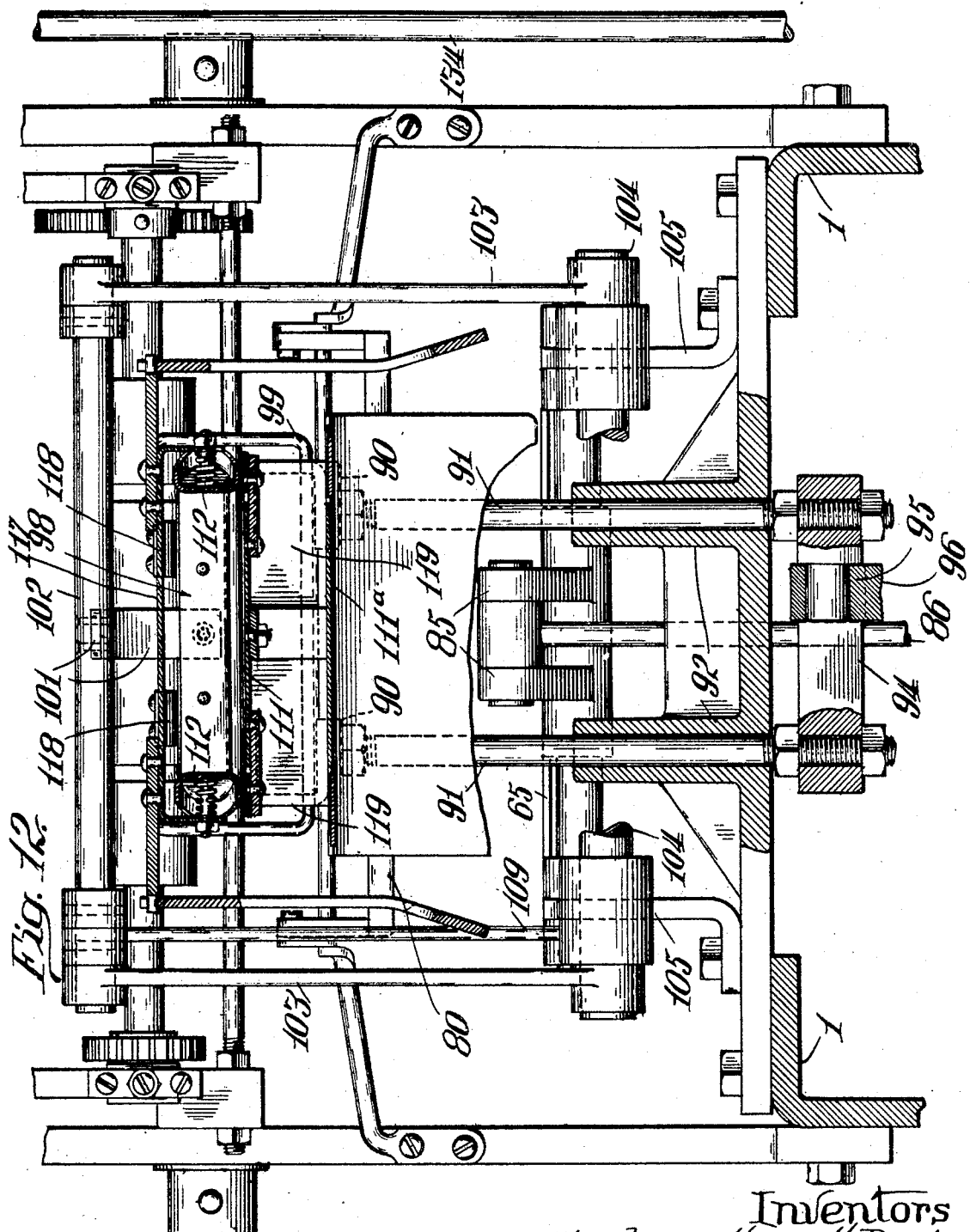

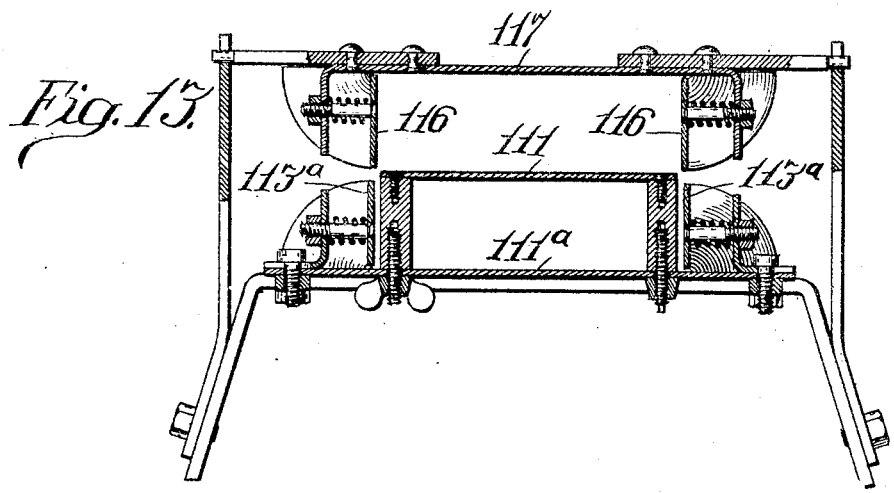
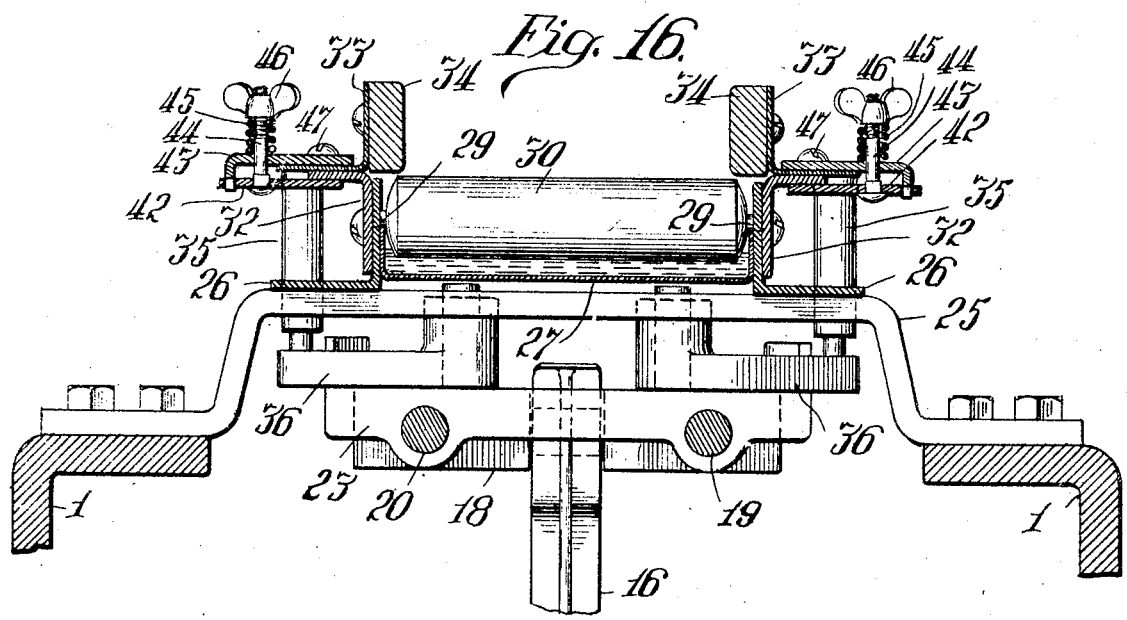
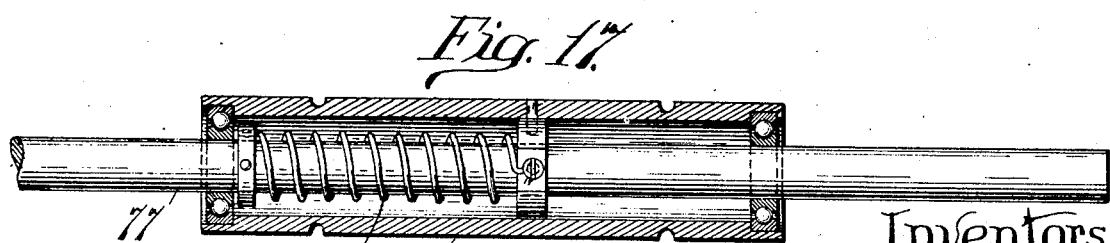

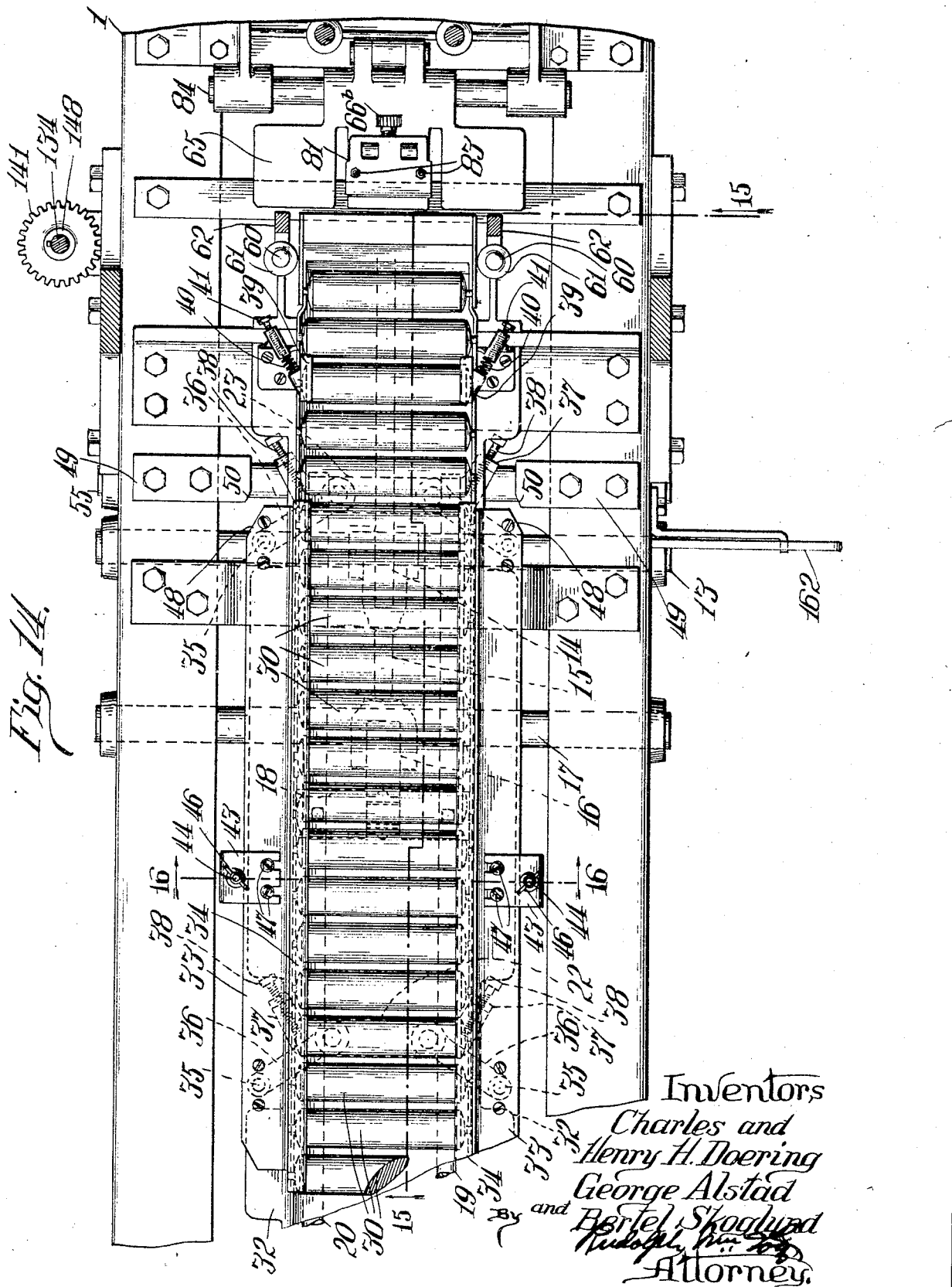

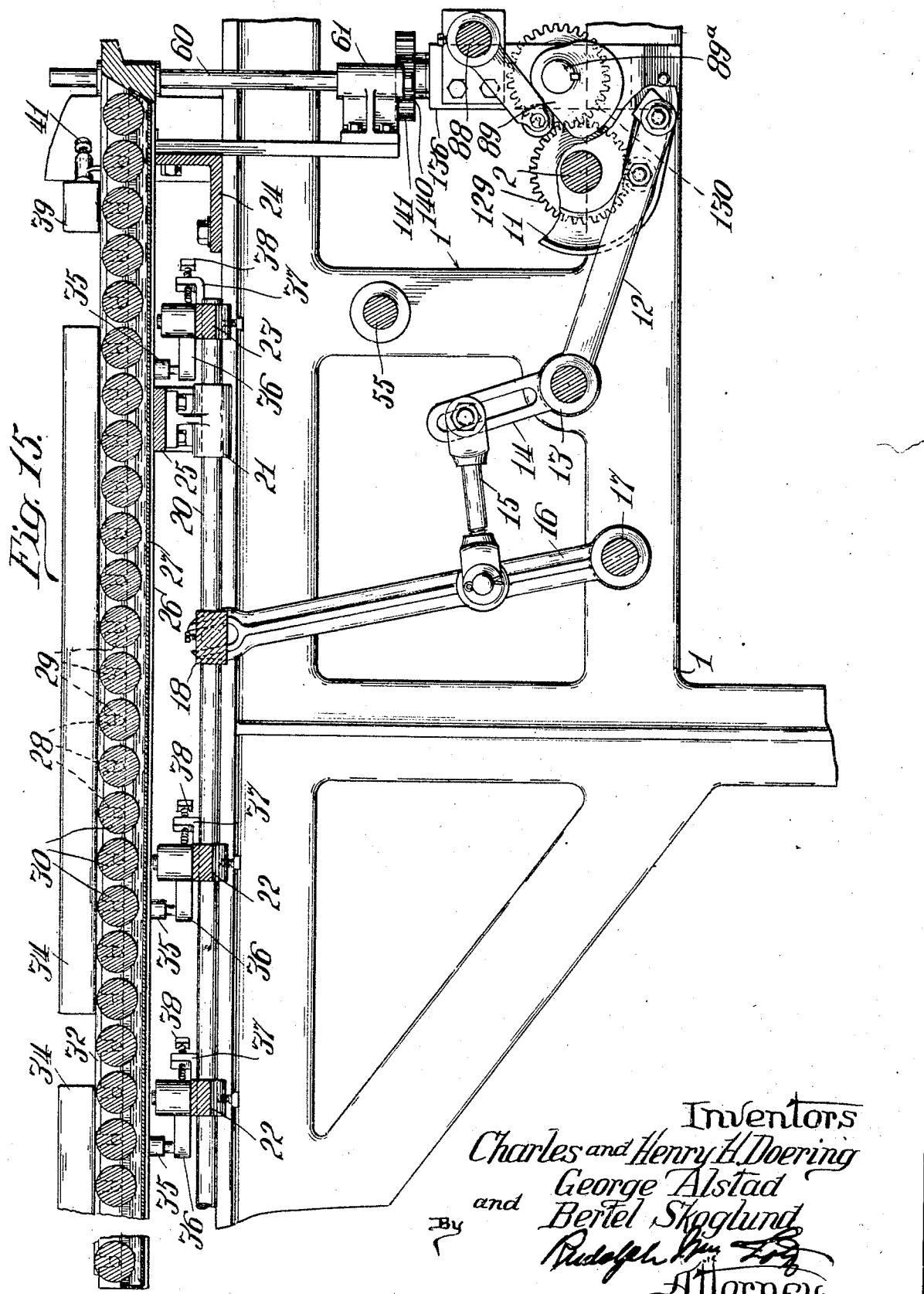

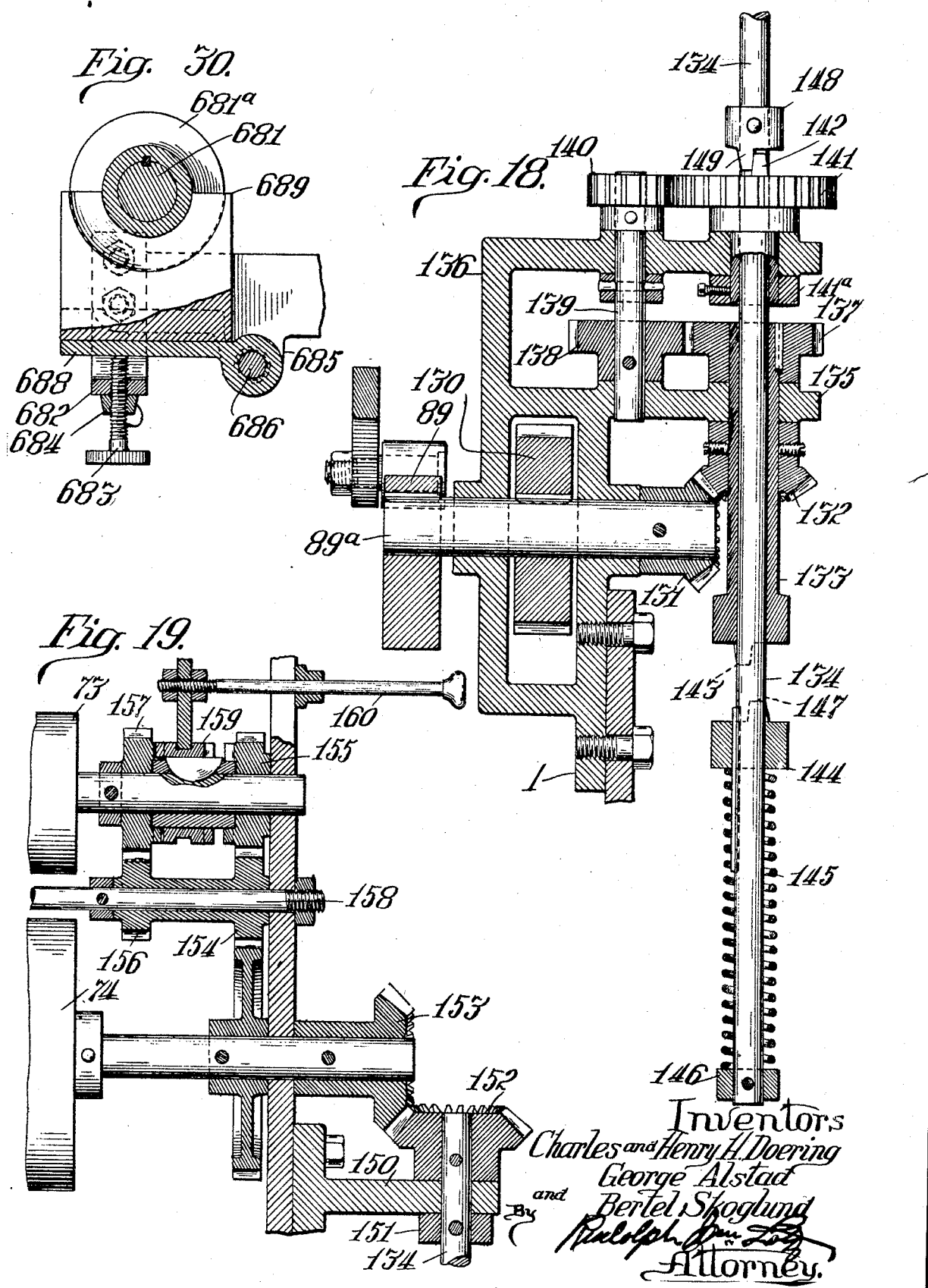

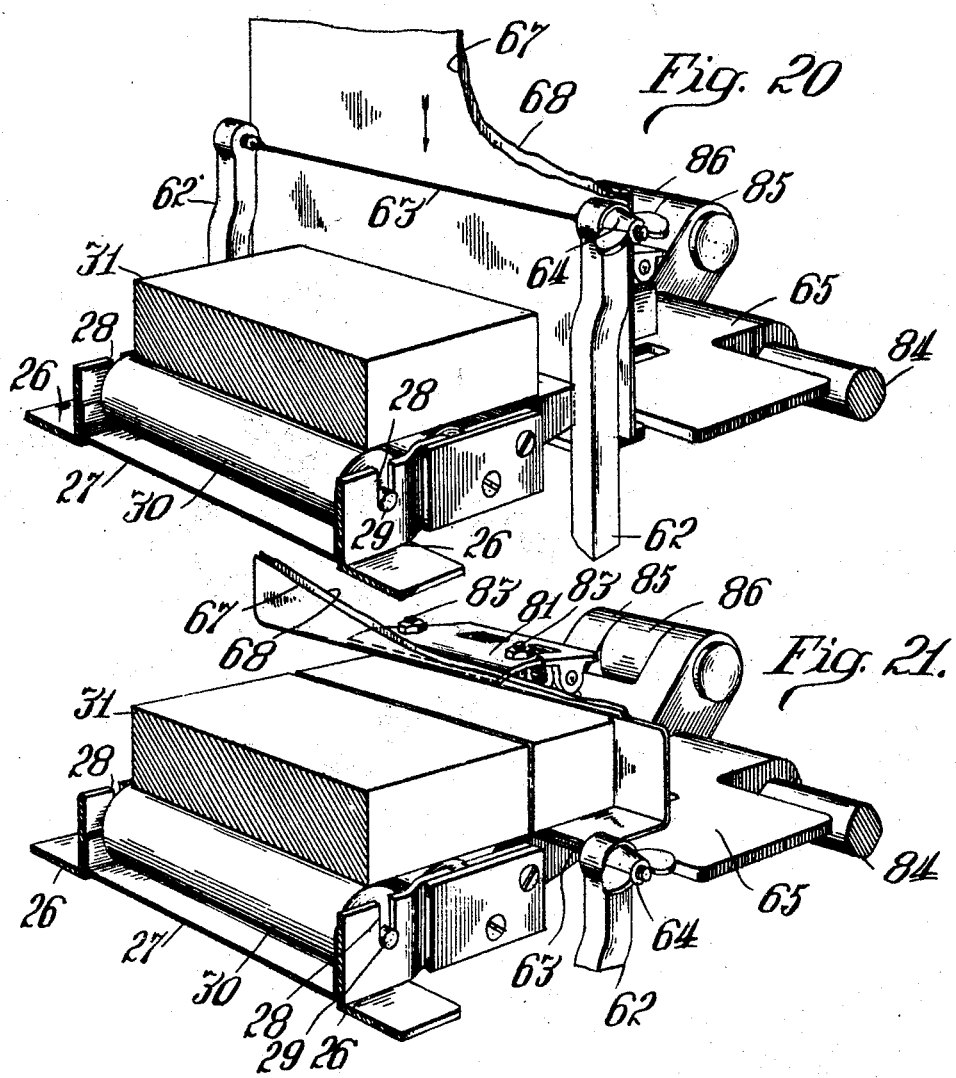

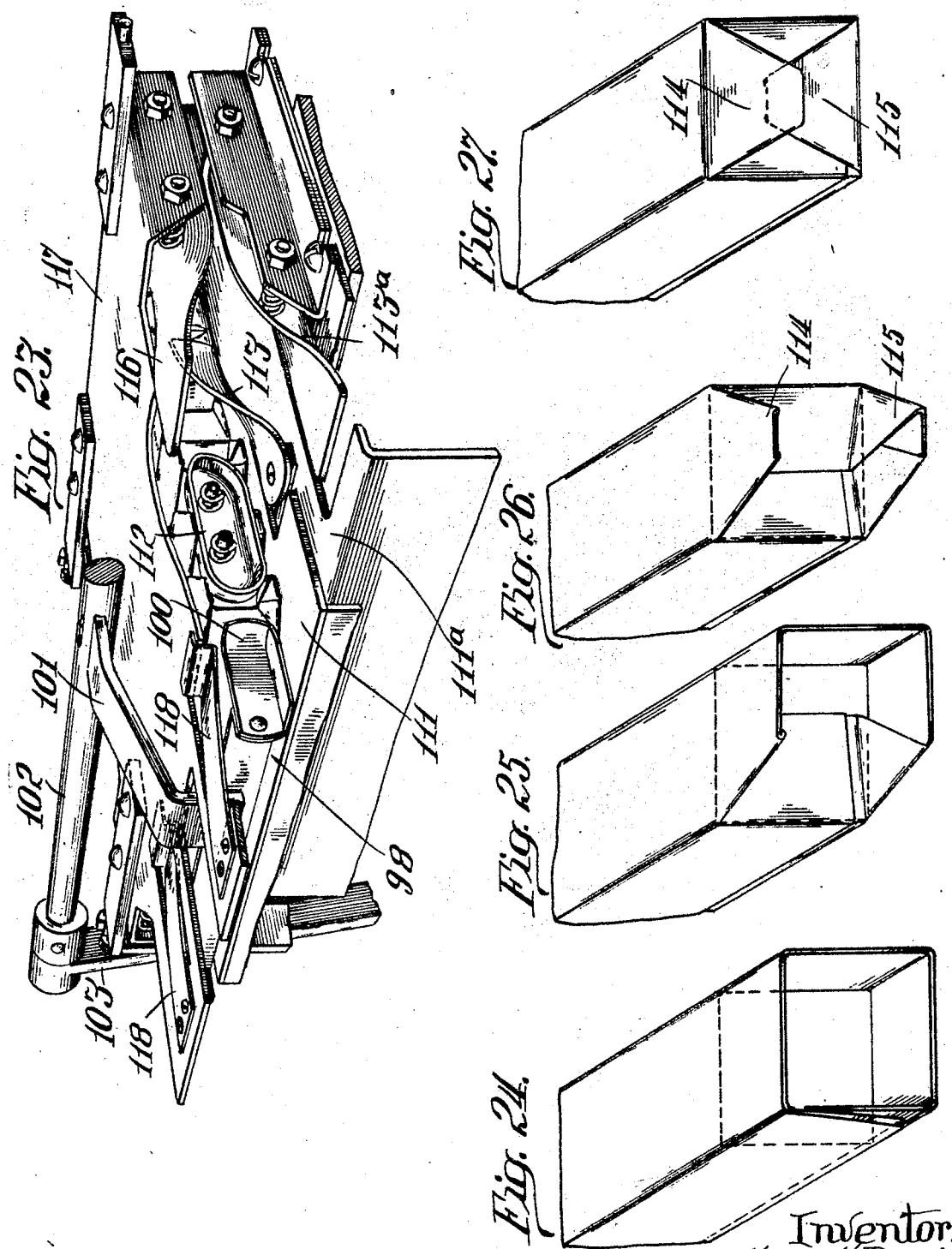

Patented May 17, 1932

1,858,540

UNITED STATES PATENT OFFICE

CHARLES DOERING, HENRY H. DOERING, GEORGE ALSTAD, AND BERTEL SKOGLUND, OF CHICAGO, ILLINOIS, ASSIGNORS TO SAID CHARLES DOERING AND SAID HENRY H. DOERING

WRAPPING MACHINE

Application filed November 28, 1928. Serial No. 322,476.

This invention has for its object to provide a wrapping machine for wrapping articles varying in size, that is to say, to provide a machine of this character which may be adjusted to adapt it to wrap an article of one size, may then be adjusted to wrap an article of another size, and so on. In the instant case, the machine is designed and adapted to wrap butter prints or bricks or articles of similar shape and dimensions but may be changed and varied in some structural details to adapt it to wrapping articles of sizes and shapes differing from those of conventional butter prints or bricks.

This machine, as illustrated in the accompanying drawings, comprises a series of associated mechanisms, each of which accomplishes certain definite objects which will be best understood and appreciated if stated in connection with each of said mechanisms as described and are, therefore, set forth accordingly in the following pages.

In the accompanying drawings illustrating a machine embodying the invention:

Fig. 1 is a side elevation of a butter print wrapping machine constructed in accordance with the invention.

Fig. 2 is a fragmentary side elevation of the same looking at the side of the machine opposite that shown in Fig. 1.

Figs. 3 and 3ª together constitute an enlarged vertical longitudinal section of the machine on a plane just inside of the side frame of the same shown in Fig. 1.

Figs. 4 and 4ª together constitute an enlarged vertical transverse section of the machine on the line 4—4 of Figs. 3 and 3ª.

Fig. 5 is a fragmentary detail vertical section on a plane substantially midway between the side frames.

Figs. 6 and 7 are fragmentary detail sections similar to Fig. 5 showing parts of the machine in different positions.

Fig. 8 is a further enlarged fragmentary detail vertical longitudinal section of a plane inwardly of but adjacent to the plane of the section shown in Figs. 3 and 3ª.

Fig. 9 is a fragmentary plan section of the machine on the line 9—9 of Fig. 1.

Fig. 10 is a fragmentary plan section on the line 10—10 of Fig. 5.

Fig. 11 is a sectional view similar to Fig. 10 showing the machine adjusted and equipped to wrap larger articles than could be wrapped by the same as shown in Fig. 10.

Figs. 12 and 13 are detail sectional views on the lines 12—12 and 13—13 respectively, of Fig. 5.

Fig. 14 is a plan section of the primary feed mechanism of the machine on the line 14—14 of Fig. 1.

Fig. 15 is a fragmentary vertical longitudinal section on the line 15—15 of Fig. 14.

Fig. 16 is a fragmentary detail section on the line 16—16 of Fig. 14.

Fig. 17 is a central longitudinal section of one of the paper feed rolls employed.

Figs. 18 and 19 are detail sectional views on the lines 18—18 and 19—19, respectively, of Fig. 2.

Figs. 20 and 21 are fragmentary detail perspective views showing the cutting and a part of the primary feed mechanism of the machine.

Fig. 22 is a fragmentary detail perspective view of a partially wrapped parcel transferring mechanism of the machine.

Fig. 23 is a fragmentary detail perspective view of the means employed for completing the wrapping of the parcel.

Figs. 24 to 27 inclusive illustrate the successive steps performed by the machine in folding the ends of the paper wrapping of a parcel by the means shown in Fig. 23.

Fig. 28 is a perspective view of a paper feed and perforating roll employed.

Fig. 29 is a fragmentary detatil section on the line 29—29 of Fig. 1.

Fig. 30 is a sectional view on the line 30—30 of Fig. 29.

Primary feed mechanism

The machine, as illustrated, being designed and intended to wrap butter bricks or bricks or prints of material of a similar nature, fed into the same in the form of long slabs of said material or product, includes means for successively cutting from the end of the slab pieces of predetermined length, the cross-sectional dimensions of the slab being such that each piece so cut therefrom will be of a given weight.

Assuming that the material is butter, it is very obvious that the slab thereof must be introduced and maintained at a sufficiently low temperature to harden it sufficiently to prevent its distortion by the feed and other mechanisms acting upon the slab and upon the pieces or bricks cut therefrom.

A fine taut wire is recognized as the most efficient tool for cutting butter and soft cheese and the like and in the instant machine such a wire is used for effecting severance of the slab, the wire in this machine being reciprocated and performing its cutting function on the down-stroke. The up-stroke of said wire is a free one in the same plane as the down-stroke so that, if the slab of material remains in the position to which it is brought an instant before the down-stroke of the cutting wire, the upstroke of the latter would cause it to brush the end of the slab and roughen its surface and produce an undesirable burr along its top edge and will sometimes remove particles or lumps from said surface.

To avoid this difficulty is one of the objects of this invention and may be accomplished either in the specific manner illustrated and hereinafter particularly described which consists, broadly, in causing a relative separation of the planes of the front surface of the slab and that of the up-travel of the wire an instant after completion of the cutting stroke of the latter, or by other equivalent means.

A further object of the invention is to provide slab feeding means which will intermittently engage and release the slab sufficiently positively to assure accuracy of dimensions of the bricks cut therefrom and yet will not effect distortion of the slab.

With these main objects in view and referring particularly to Figs. 1, 2, 3ª, 4ª, 14, 15, and 16, it will be noted that the machine includes side-frame members 1 carrying bearings in which the main drive shaft 2 is journalled, the latter being geared to the motor 3 or other source of power by means of the gear 4, pinion 5, pulleys 6 and 7, belt 8, and gears 9 and 10.

The shaft 2 carries a plurality of cams including a cam 11, a part of which is shown in Fig. 15 and engages a roller adjacent the outer end of a lever 12 rigid with the rock-shaft 13. The latter carries the longitudinally slotted arm 14 with which one end of a link 15 is adjustably connected, said link being also adjustably connected with the arm 16 of the rock-shaft 17. The bifurcated free end of the arm 16 engages a cross-head 18 rigid with the parallel reciprocable shafts 19 and 20 (Fig. 16) suitably journalled in bearings 21 of the machine.

The shafts 19 and 20 are further associated by means of cross-heads 22 and 23.

Mounted upon cross frame members 24 and 25 are angle iron supports 26 which support a water trough 27 between them. Said angle irons are provided at regular intervals with vertical recesses 28 in which the trunnions 29 of idle rolls 30 engage, said rolls being partially immersed in the water contained in said trough and carrying and being rotated by the slab 31 of butter or other product to be cut into bricks.

Secured to the angle irons 26 in reverse relation to the latter are angle irons 32 upon the outwardly extending flanges of which the angle irons or plates 33 are slidably mounted, the vertical flanges of the latter being equipped with shoes 34, preferably of wood, which project over the ends of the idle rolls 30 and between which the slab 31 is engaged at intervals for feeding the same progressively forward.

The upper horizontal flanges of the angle-plates 32 are cut away at intervals to provide spaces in which posts 35 secured at their upper ends to the angle plates 33 may move. Four pairs of said posts 35 are provided, each post being connected at its lower end to a link or toggle lever 36 which, at its other end, is pivotally associated with one of the cross-heads 22 and 23, said links being normally disposed at an angle of about forty-five degrees to shafts 19 and 20 so that as said shafts move in one direction the said links will tend to draw the angle plates 33 toward each other and, when moved reversely, will tend to force said plates 33 apart.

It is desirable that the spread of the shoes 34 upon release of the same from contact with the side faces of the slab shall be limited and, to this end, the cross-heads 22 and 23 are equipped with brackets 37 in which set-screws 38 are mounted. The latter form adjustable stops for limiting the pivotal movements of the links or toggle levers 36 in one direction to thereby limit the spread of the shoes 34.

It will be further noted that the shoes 34 have their inner ends spaced from the delivery end of the series of idle rolls 30. The intermittent movements of the slab are rather quick and are followed by release of pressure of the shoes 34 against the sides of the same. As the slab is quite heavy, this impetus or momentum might cause the same to break at some point or to slip and thus move farther than intended and to avoid this, it is preferable to interpose retarding or brake-shoes 39 in the path of the side faces of the slab. said shoes being adapted to exert a rather light, yielding pressure which is determined by the springs 40 and set-screws 41 associated therewith, as best shown in Fig. 14.

There are also associated with the slab feeding mechanism the spring-brake devices, each comprising a flat-plate 42 with which another flanged plate 43 has a hinge-like association at one end. These plates are further associated by means of a bolt 44, spring 45, and wing-nut 46 which compresses the spring 45 against the plate 43 to cause the free ends of the plates 42 and 43 to be forced toward each other. The plate 43 has recesses in its free end for the passage of the shanks of screws 47 which secure the same to the horizontal flanges of the angle-plates 33. The said plates 42 and 43 yieldingly press the said horizontal flanges of the plates 32 and 33 together and resist their relative movement to thus prevent the shoes 34 from slapping and thus possibly upsetting or distorting the side faces of the slab.

It will be further noted that the horizontal flanges of the angle-plate 33 have their corners cut away as at 48 at an angle of about thirty degrees to their outer longitudinal edges and that there are mounted on the frame member 25 the plates 49 having similarly cutaway corner portions 50 which are so disposed as to contact with the surfaces 48 when the angle plates 33 attain the limit of their feed stroke.

Obviously upon reverse stroke of the shafts or bars 20 the initial tendency would be for the links 35 (which may be defined as "toggle-links") to be spread to thus first impart lateral separating movement to the shoes 34 to release the slab and thereafter move them longitudinally. The cutaway corners 48 being, at the time of initiation of the reverse stroke of the shafts 20 in contact with the corner surfaces 50, the initial reverse movement of the shoes 34 will be longitudinal for a distance of a small fraction of an inch during which the slab will remain engaged with the shoes and will be moved rearwardly with the latter. The separating or disengaging movement of the shoes 34 follows this minute initial back-stroke and thus the slab will retain the desired position.

It will be obvious, of course, that in place of a single slab of material being fed forward by the above described mechanism, a series of bricks of material may be so fed, and that the idle rolls supporting the slab may be regarded as a traveling or movable carrier of a type suitable to the needs of the material to be wrapped, the changes in mechanical details required for adapting the feed mechanism to handle separate bricks or the like in place of a continuous slab being well within the skill of a mechanic and obviating illustration of such obvious modifications.

The above described feed mechanism is, when used for feeding a slab, directly associated with a slab cutting mechanism, and, in either case, whether feeding a slab or a series of bricks or the like, is also associated with paper feed mechanism and an initial wrapping and transferring mechanism which will be described in the order named.

The sole object of the cutting mechanism, the description of which next follows, is to provide an efficient device adapted to effect a smooth cut and which is timed to operate very rapidly on the down or cutting stroke and to return relatively slowly to its initial position so as to allow ample time for the product slab to make its slight return stroke and also allow the platform 65 to remove the brick or other object away from the cutting plane.

*Slab cutting mechanism*

Mounted on the shaft 2 (Figs. 3, 3ª, and 4ª) is a cam 51 upon which the roller 52 on the plunger 53 rides, the latter having a forked lower end sliding on said shaft 2 and being pivotally connected at its other end with the lever 54 between the ends of the latter. The lever 54 is pivotally secured at one end to a cross rod 55 of the frame and is provided with a longitudinal slot 56 at its other end in which the carrier for a stud-shaft 57 is adjustably mounted. The stud-shaft 57 carries the link 58 which is pivotally associated with a cross-bar 59 rigidly associating a pair of vertical plungers 60 journalled in the bearings 61 of the frame.

The cross-bar 59 carries the supporting posts 62 for the cutting wire 63 which spans their upper free ends and is secured thereto at said ends, the securing means including a threaded member and wing-nut 64 for adjusting the tension of said wire, the stroke of the latter being varied to accord with varying thicknesses of slabs by adjusting the position of the stud-shaft 57 along the slot 56. It will be noted that the shape of the cam 51 is such that the downward or cutting stroke of the wire is very rapid as compared with its return or up-stroke. The relative positions of the cams 11 and 51, and the shape of the former, etc. are such that the down or cutting stroke of the wire immediately follows the completion of the feed-stroke of the feed mechanism while the initial reverse stroke of the latter is completed before the up-stroke of the cutting wire has brought the latter up to the plane of the bottom of the slab.

The forward end portion of the latter is projected upon a platform 65 and against a plate 66ª on the latter as the feed stroke of the feed mechanism is completed, the severed end portion of the slab, now constituting a brick of material, remaining supported upon said platform as the cutting wire completes its cutting stroke.

In the event that a series of bricks or the like are fed by the feed mechanism then the cutting wire is, of course, removed, the remaining mechanism being unchanged.

The cutting wire and the elements associated therewith are illustrated as being gravity actuated to produce a cutting stroke of the said wire. Obviously, if the force of gravity is found insufficient for any given product, it may be supplemented by a spring or springs acting to hold said wire and said parts normally at the lower limit of their movement. The downstroke may also be rendered positive by using a grooved instead of a face cam 51, these modifications being too obvious to require illustration.

The main object of the next succeeding mechanism to be described is to efficiently feed and sever a paper strip to provide sheets of uniform and proper length to wrap each size of package to the wrapping of which the machine may be adjusted and to support each successive sheet for the proper time interval and release the same at the proper instant to permit the proper functioning of the wrapping mechanism. A further object of the paper feed mechanism is to provide simple and efficient means for feeding and severing a strip or strips of paper and permit control of said feeding means to prevent undue tension on the paper at a point in advance of that at which it is severed to form the wrapping sheets.

Another important object of this mechanism is to render it bodily adjustable so that long or short wrapping sheets supplied thereby to the wrapping mechanism will be properly positioned with respect to the latter and the feed mechanism.

Paper feed mechanism

Preceding each feed-stroke of the feed mechanism, paper from a roll or rolls 67 and 68 is fed to depend partially between the edge of the platform 65 and the opposed end of the slab or next brick to be projected upon the platform 65, the depending end portion of the paper sheet or sheets being thus carried upon the said platform and being disposed initially between the bottom of the brick and the top face of said platform and also between the front face of the brick and the opposed face of an adjustable plate 66ª associated with the flange 66 by means of an adjusting screw 66ᵇ.

As shown in Fig. 3 and in detail in Fig. 5, the said paper projects beyond the front edge of the platform 65 but does not entirely cover the lower face of the brick.

Referring now to Fig. 3, it will be noted that the rolls 67 and 68 are carried by suitable brackets at the top of the machine frame. The paper of roll 67 is preferably of the waterproof type while that of roll 68 may be of any other suitable kind, the paper strips being also indicated by reference numerals 67 and 68, respectively.

The strip 67 is trained over an idle roll 69 which is partially immersed in water in a pan or trough 70 and then passes between a pair of idle squeegee rolls 71 which are spring held in surface contact. The strip 67 then passes over the idle roll 72 and then between a pair of driven rolls 73 between which the strip 68 also passes. These rolls 73 are geared to a pair of perforating rolls 74, one of which carries one or more serrated blades 75 (Fig. 28) for effecting such partial severance or lateral weakening of the strips 67 and 68 at regular intervals as will permit said strips to easily separate at these points under the influence of sudden tension on said strips. The rolls 73 and 74 have equal surface speed so that no tension will be exerted on the paper strips between the lines of engagement thereof by said respective pairs of rolls which, however, firmly engage said strips against slippage.

Below the rolls 74 is another pair of rolls 76 between which the strips 67 and 68 are engaged. These rolls are rotatably mounted on a pair of shafts 77 driven at equal speed, said speed being, however, such that if the rolls 76 were rigid with said shafts 77 their surface speed would be appreciably greater than that of the rolls 73 and 74. Helical springs 78 each connected at one end with a roll 76 and at its other end with a shaft 77 in the manner of a window shade roller spring, serve to cause said rolls 76 to normally rotate with the shafts 77 but by reason of the more rapid rotation or higher normal surface speed of the rolls 76 than the rolls 74, and because of the firm engagement of the latter with the strips 67 and 68 to prevent their slippage, the said rolls 76 are prevented from rotating in unison with the shafts 77 but are caused to lag and thereby partially wind up said springs 78 until the perforate severance lines has been cut into said strip. An instant following the perforation, the said severance line will be free from engagement of the rolls 74 and the stored up energy of the springs having now placed the strip under a tension greater than the perforate severance line can resist, the severance is effected. The severed length of paper strip becomes instantly spaced from the body portion and an apron thereof is thus caused to depend into the path of the brick to be wrapped. The moistening of the strip 67 causes the two strips to remain in close surface contact during travel from the rolls 73 to the time of completion of the wrapping operation and this moistening overcomes the tendency of the strips to curve besides increasing the weight of the apron portion so that the latter tends to always hang substantially straight. However, to assure the proper position of this apron portion with respect to the brick to be wrapped, it is preferable to use suitable guides such as the members 79 and 80.

All of the above-mentioned driven rolls are continuously as distinguished from intermittently operated thus assuring a smooth running of the rolls 67 and 68. Obviously the severed strip will pass out of engagement from between the rolls 76 very shortly after its severance so that the engagement of the lower end portion of the depending apron portion by the brick to be wrapped and the platform 65 and member 66 must occur at an instant immediately following severance, the mechanism being synchronized to effect this timing.

A member 80ª is provided which is vertically adjustable and affords a guide to determine the proper position of the lower edge of the wrapping paper and, consequently, also a guide to determine the proper position of the paper feed mechanism on the machine frame, said mechanism being, as hereinafter pointed out, bodily adjustable on said frame.

In Figs. 1, 4, 29, and 30, there is illustrated an important part of the paper feed mechanism which permits adjustment of the shafts carrying the paper feed rolls longitudinally of each other and also substantially vertically for the purpose of bringing said shafts and the rolls carried thereby into perfect alignment so that the paper strips 67 and 68 will be maintained in proper relative position with their side edges in register and will properly pass into the requisite position to accomplish the uniform wrapping of the butter bricks or the like. This mechanism also includes brake means which prevent the shafts and paper rolls from continuing rotation responsively to the intermittent momentum imparted to them at each operation of the rolls 73 and 74.

Thus each of the shafts 671 and 681 of the respective rolls is provided adjacent one end with a collar 681ª provided with a V-shaped annular groove. Mounted upon the side frame members of the machine adjacent the ends of the arms at the upper portion thereof are brackets 682 in each of which there is engaged a vertically adjustable set-screw 683 with which a lock-nut 684 is associated. Each of the last-mentioned arms of the side frame members is equipped with a threaded sleeve 685 in which a screw-shaft 686 equipped with a hand-wheel 687 is engaged, the inner end portion of each screw-shaft 686 being cylindrical and rotatably engaged with the sleeve end of a member 688 which carries a supporting block 689 having a recess in its upper end to receive the collar 682, the walls of said recess being V-shaped to engage in the groove of the collar, and thus resist rotation of the shaft with which the collar is associated. The other end of the member 688 rests upon the upper end of the set-screw 683 so that by rotation of the latter the end portion of the shaft supported by said member may be raised and lowered. The screw-shaft 686 permits the shaft to be adjusted longitudinally so that the roll of paper carried thereby may be moved to proper alignment with the companion roll, the adjustment effected by the set-screw 683 being very slight and serving only to bring the two roll carrying shafts into such relative positions as to cause the paper strips to properly feed off the said rolls as above indicated.

The brake action of the collars 681ª and 689 is regulated by gravity and becomes less pronounced as the paper rolls become lighter, thus automatically adjusting the degree of resistance to rotation of the shafts 671 and 681 to the variations in weight of the paper rolls.

The next succeeding mechanism to be described is what is termed "the wrapping mechanism" of which, of course, the slab or article feed mechanism and the paper feed mechanism are, in a sense, a part in that each feed movement of the slab feeder constitutes the initial wrapping operation, thereby obviating the use of additional mechanism to accomplish this step.

The main object of the wrapping mechanism is to obviate as many operating parts as possible and, in fact, to utilize the transferring of the brick or article together with rigid, as distinguished from operating, parts to complete the wrapping operation, the travel and partial rotation of the article while engaged with the platform 65 cooperating with the fixed elements to complete one step in the wrapping and its transfer from the platform 65 to a position in front of the folding mechanism, cooperating with another fixed element to complete the wrapping.

The accomplishment of the foregoing steps in the manner suggested and by the means hereinafter fully described is obviously very important from the standpoints of simplicity, efficiency, low cost of construction, and lack of liability to disorder of the machne as well as greater durability and lower cost of operation, maintenance and repair.

The simple means for effecting the wrapping is of extreme importance also in permitting adjustment of the machine to wrap bricks or packages varying in size.

*Wrapping and transferring mechanism*

From the foregoing it will be understood that the completion of the feeding operation is coincident with the initial wrapping operation. The latter is succeeded by further wrapping and folding steps in order that the paper strips may first be brought to cover the four longitudinal faces of the brick and the ends of said strips then folded in upon the end surfaces of said brick, the wrapping operations being separate and distinct from the folding operations.

Hence the platform 65 and member 66 constitute parts of the wrapping mechanism and also parts of the transferring mechanism. The member 80 also constitutes a part of the wrapping mechanism.

The member 66 is equipped with a plate 81 which is pivotally mounted upon its upper edge and overhangs that portion of the platform which receives the brick to be wrapped. Normally there is a considerable amount of free space between the plate 81 and the plane of the top face of the brick, the said plate being, at the moment of deposit of the brick on the said platform, in an upwardly inclined position so that the brick may freely pass to said platform. This, however, causes the paper strips to be distorted to partially overhang the top face of the brick but not to lie in close contact therewith as shown in Fig. 1.

The plate 81 is normally held by springs 82 in engaging relation to the top face of the brick to be wrapped and is held in the position of Figs. 3 and 5 by the plunger rods 83 which loosely engage said plates at their upper ends and pass through guide openings in the platform 65 between their ends. The lower ends of said rods 83 bear upon the adjustable stop members 83ª to raise and maintain said plate 81 in the position of Figs. 3 and 5 while the platform 65 is horizontally disposed.

The said platform 65 is mounted at its rear end on the rock-shaft 84. The latter is equipped with a pair of arms 85 which is connected at its free end with the rod 86. This pair of arms is disposed midway between the ends of the shaft 84 (see Fig. 12) and the rod 86 is connected at its other end with the slotted end portion of a lever 87 (see Fig. 3ª) pivotally mounted between its ends on a shaft 88 and, at its other end engaging the cam 89, this mechanism being arranged to rotate the platform through an arc of ninety degrees instantly following the cutting stroke of the wire. The cam 89 is mounted upon a counter-shaft 89ª.

At this time the sheets 67 and 68 severed from the strips will be free from the rolls 76 and will present now a free upper apron portion outwardly of the edge of the plate 81. This free apron will, however, tend to drop downward over the top and exposed side face, respectively, of the brick carried by the platform 65 and as said platform swings through the said arc, said apron will brush the member 80 which lies in close proximity to the arc described by the exposed side face of the brick and will thus cause said apron to quite closely overhang said exposed side face which becomes the top face of the brick when the platform has completed its upward swing. A relatively short free apron of paper now overhangs what was primarily the bottom face of the brick and this, when turned or folded down upon said face will overlap the portion of the paper already covering said face of said brick.

The member 66 and plate 81 and stop-plate 66ª are of considerably less width than the platform 65 and also of less width than the length of said brick or width of the slab of product. Consequently the end portions of said brick will project beyond the ends of the member 81ª when said platform 65 is in its upright position. The said ends of said brick are now disposed in the path of elevator plates 90 which are mounted upon a pair of vertically reciprocable coupled plunger rods 91 journalled in the vertical bearings 92 of the transverse frame member 93. The cross-head 94 coupling said plunger rods is provided between its ends with a wrist portion engaged with the bearing 95 at the upper end of the connecting rod 96 which, at its lower end, is pivotally engaged with one end of the lever 97 mounted between its ends on the rock-shaft 88, the other end of said lever carrying a roller engaging in the groove of the cam 11.

Immediately following the upswing of the platform 65, the elevator plates 90 move upwardly into engagement with the end portions of the brick and carry the same free of said platform 65 and plate 81 which bears only very lightly upon the brick.

When the elevator plates 90 have attained the upper limit of their movement (Fig. 7) the brick is disposed between the horizontally reciprocable plunger 98 and the mouth of which shall be termed the folding chute of the machine. As the brick becomes disposed opposite the plunger 98, the still free apron of paper last above referred to will brush the rod 99, disposed in the path of said apron below the plunger 98 and will thus be caused to depend in front of or lie in contact with the former bottom face of the brick to thus complete the wrapping operations.

Another extremely important object of the invention is to provide a folding mechanism for folding in the projecting edge portions of the wrapping sheet by means including only one operating element, viz: a reciprocable plunger for forcing the bricks or articles through folding means consisting entirely of stationary cams except insofar as the first folding operation is effected by the said plunger. This method of effecting the said folding operation is obviously very advantageous because it also obviates the use of a large number of operative elements and thus not only effects great cost economy, etc., but also because this means of effecting the folding lends itself so readily to the adjustment of the machine to the wrapping of bricks or articles varying in size.

*The folding and delivery mechanism*

The plunger 98 performs several functions, the first being to press the overlapped ends of the paper now enclosing the brick into close contact with the primarily bottom face of the latter which is now opposed to said plunger, and, at the same time to turn or fold the end portions of said paper which covers the last-mentioned face of said brick over the corners of said face and into close contact with the end faces of the brick.

Thus said plunger 98 which is of a width equal to the length of the brick, is provided at its ends with projecting flanges or fingers 100 which perform the aforesaid folding operation as the face of said plunger approaches the opposed face of the brick. The flanges or fingers 100 exert a sufficient tension on the overlapped ends of the paper wrapping to draw the same smoothly over the face of the brick opposing the plunger so that as the latter bears upon said paper it serves only to compress the same against said face.

The plunger 98 is rigidly secured to the arm 101 of a rock-shaft 102 which is journalled in bearings at the upper ends of a pair of levers 103 carried by the rock-shaft 104 journalled in bearings carried by supporting members 105 which also carry the bearings for the rock-shaft 84. One of said levers 103 has an arm 106 provided in its free end portion with a slot with which one end of a connecting rod 107 is adjustably associated, the other end of said rod 107 being connected with the extreme end of the lever 12 associated with the cam 11 and with the reciprocating feed shafts 20 of the feed mechanism.

The rock-shaft 102 is equipped at one end with a crank-arm 108 to the outer end of which a rod 109 is pivotally secured, the other end of said rod 109 being pivotally associated with a stud-shaft 110 on the bearing support 105 at one side of the machine frame. This stud-shaft 110 is spaced from the rock-shaft 104 a distance equal to that separating the rock-shaft from the pivotal connection of the rod 109 with the crank-arm 108, the length of the said rod 109 between its pivotal axes being equal to the length of the levers 103 from the axis of the rock-shaft 102 to the axis of the rock-shaft 104. The function of the rod 109 is to prevent swing of the plunger 98 as the same reciprocates. The stroke of said plunger 98 is such that it will move successive bricks free of the elevator plates and upon the bottom plate 111 of the folding chute.

At this point attention is directed to Figs. 23 to 27 inclusive, Fig. 23 showing the folding chute and part of the folding cams therein in perspective, and Figs. 24 to 27 illustrating the several folding steps effected by the folding mechanism. Thus Fig. 24 shows the brick with its wrapping as delivered by the elevator plates into the path of the plunger 98. Fig. 25 shows the first folding step completed as effected by the flanges 100 of the plunger 98. Fig. 26 shows the second folding step effected by the stationary cam members 112 (hereinafter described), and Fig. 27 shows the two final folding steps completed by the side cams including the cam 113, Fig. 23, of the chute as the brick is forced through the latter.

The wrapped brick is snugly confined between the top and bottom walls of the folding chute, the side walls of the latter being formed so that they are flat only along their rear end portions, the front end portions being each bent or formed tortionally to present a vertical rear end which merges into the flat vertical rear end portion of the wall and terminate in a horizontal front end portion over which the outwardly extending partially folded paper tongues 114 and 115 ride (see Fig. 26). These cam formations are relatively so arranged that the lower tongues 115 of the wrapper are folded or creased along the lower corners of the end faces of the brick before the upper tongues 114 of the said wrapper are so creased along the upper corners of said end faces so that when the folding operations have been completed, the upper tongues 114 will overlap the lower tongues 115.

The cam plates 113 are clearly shown in Fig. 10 and the cam plates 116 for turning down the tongues 114 are shown in part in Fig. 10 while in Fig. 8 both cam plates 113 and 116 at one side of the chute are clearly shown as is also one of the cam members 112.

The top wall 117 of the chute projects to overhang the elevator plates and the plunger 98. Said top plate is longitudinally slotted to accommodate the arm 101 and also to accommodate the flat springs 118 which bear lightly upon the top face of the brick as the latter passes into the folding chute (see Figs. 8 and 23).

As the bricks are delivered from the chute, they are cartoned either manually or otherwise.

When the machine is adjusted to wrap 1 lb. bricks, the latter are delivered by the elevator plates 90, devoid of extension members, upon the bottom plate 111$^a$ of the folding chute.

In wrapping ¼ lb. bricks, the plunger 98 is provided with an extension member 98$^a$. Said plunger is also vertically adjustable on the arm 101 which carries it to accord with the deep and shallower folding chutes required for the different sizes of bricks to be wrapped.

*Adjustability for wrapping bricks of different dimensions*

A very important object of the invention is to render the same adjustable to wrap butter or other bricks of different weights. At the present time these bricks are most commonly of 1 lb., ½ lb., and ¼ lb. weight, respectively. Assuming for the purposes of this specification that a 1 lb. brick is six inches long and two inches square, then the ½ lb. brick is of the same length and width as the 1 lb. brick but only one inch thick while the ¼ lb. brick is of the same length and but one inch square.

The 1 lb. and ½ lb. bricks will be cut from a slab six inches wide and two inches thick while the ¼ lb. bricks will be cut from a slab one inch thick.

In all of the figures of the drawings except Figs. 8 and 11, the mechanisms are shown adjusted to wrap ¼ lb. and ½ lb. bricks while in Figs. 8 and 11, they are shown adjusted to wrap 1 lb. bricks.

For the ¼ and ½ lb. bricks, the feed stroke of the feed mechanism is exactly ½ of what it is for the 1 lb. and obviously, the members 66 and 66ª with their associated parts must be of the height required for a 1 lb. brick when ½ lb. bricks are to be wrapped. After the ½ lb. bricks are delivered from the platform 65 by the elevator members, the folding operations will be exactly the same as for the ¼ lb. bricks.

However, the elevator plates 90 when carrying the ¼ and ½ lb. bricks are equipped with extension members 119 which are removed when handling 1 lb. bricks. And in handling the ¼ and ½ lb. bricks, the folding chute is made up of two compartments, one above the other but only the upper compartment is used, the lower portion being then merely a support for the upper portion.

When 1 lb. bricks are to be wrapped, the two compartment chute is practically removed and a chute of requisite height and equipped with corresponding cam side plates is substituted and a plunger 98 of larger size and having wider and longer flanges 100 is substituted to engage the 1 lb. bricks midway between the top and bottom faces.

The foregoing changes are very easily and quickly made and, additionally, the paper feeding mechanism is rendered easily adjustable to feed sheets of the respective lengths required for the different sizes of bricks.

Thus, for example, the perforating rolls, when effecting partial severances of the paper strips to provide for the wrapping of ¼ lb. bricks, are equipped with two diametrically opposed serrated blades and companion coacting grooves, respectively. For perforating the paper strips to provide sheets of the length required to wrap 1 lb. bricks, one of the serrated blades is removed. To provide sheets of a length adapted for wrapping ½ lb. bricks a pair of rolls equipped with one or a pair of serrated blades adapted to provide that length will be substituted for the pair of rolls shown together with a geartrain adapted for operating said rolls.

It will be very obvious that when a short sheet, such as is required for wrapping ¼ lb. bricks is to be used, the paper feed rolls must be disposed correspondingly nearer to the platform 65 in its longitudinal position than when longer sheets are used for the larger bricks and that this lowering and raising of the paper feed rolls also involves the raising and lowering of the roller operating mechanism.

The demand for ½ lb. bricks is decreasing as the ¼ lb. brick grows in popularity because of the convenience presented thereby to produce square and cube butter pats so that in place of producing ½ lb. bricks, it is now more popular to place two ¼ lb. bricks in a ½ lb. carton and, in fact there is a growing demand for 1 lb. cartons containing four ¼ lb. bricks for the reason above given. Hence the substitute rolls for feeding sheets to wrap ½ lb. bricks of the flat variety are rarely required.

Two lb. bricks or the equivalent four ½ lb. bricks of square cross-section are also being produced in gradually increasing number and, obviously, the machine as illustrated may be considered adaptable for these respective sizes without change other than dimensions of some parts.

Referring now to Figs. 2, 3, 4ª, 14, 17, 18, and 19. In Fig. 3, it will be noted that the side members of the frame are spanned at the top by a cross-bar 120 which carries the threaded hub 121 of a mitre pinion 122 in which a screw-shaft 123 engages, said shaft 123 being rotatably engaged at its lower end with the cross-bar of an inverted U-shaped frame 124 which carries the bearings for the shafts or trunnions of the several pairs of paper feeding rolls and associated rotatable elements. The side portions of the frame 124 include flanges which are secured to the side frame members of the machine by means of bolts which engage in the vertical slots 125 and 126 of said side frame members. Said bolts are loosened when it is desired to raise or lower the said frame 124 and are tightened to hold the same rigidly in the several positions to which it may be adjusted.

The mitre gear pinion 122 meshes with a similar pinion 127 on the manually operable crank-shaft 128 so that by rotating the latter when the said bolts are loosened, said frame 124 will be raised or lowered within the limits permitted by the said slots 125 and 126.

The main shaft 2 carries a spur gear 129 which meshes with a similar gear 130 on the counter-shaft and this, in turn, carries a bevel gear 131 which meshes with a bevel gear 132 rigid with a sleeve 133 rotatable and longitudinally movable relatively to a vertical shaft 134 which is disposed externally of one of the side frame members.

The sleeve 133 is journalled in a bearing 135 of a frame 136 which is rigid with one of said side frame members.

Keyed to the upper end of the sleeve 133 is a spur gear 137 which meshes with the gear 138 on the shaft 139. The latter carries a spur gear 140 which meshes with the spur gear 141 rotatable on the shaft 134 and also longitudinally movable on the latter, said gear 141 being held against longitudinal movement relatively to the frame 136 by extending its hub through the bearing in the upper arm of said frame and mounting a collar 141ª on said hub. Said gear 141 is equipped with a projection 142 as is also the lower end of the sleeve 133 with a projection 143. On the shaft 134 there is splined a collar 144 which is longitudinally movable relatively to said shaft and is supported on the compression spring 145 supported on the collar 146 at the lower end of shaft 134. The said collar 144 is provided with an upstanding projection 147 which, when engaged by the projection 143 of the sleeve 133, will cause the shaft 134 to be rotated.

A collar 148 having a downwardly extending projection 149 for engaging the projection 142 of the gear 141 is rigidly mounted on the shaft 134 in such relation to the collar 144 as to permit a considerable degree of longitudinal movement of the shaft 134, relatively to the sleeve 133 before one of the pairs of interengaging projections becomes operative to rotate said shaft 134.

At its upper end the shaft 134 is journalled in a bearing 150 carried by one side arm of the frame 124 and is held against longitudinal movement relatively to said bearing by means of the collar 151 and mitre gear 152 mounted on said shaft and engaging said bearing 150.

The mitre gear 152 meshes with the mitre gear 153 of the shaft of one of the perforating rolls 74 which is geared to the pairs of rolls 73 and 76 by simple gear trains which are clearly shown in Fig. 3 and require no special description.

As the frame 124 is raised as for feeding the long paper strips for wrapping 1 lb. bricks, from the position shown in Fig. 18, wherein said frame is positioned to feed sheets for wrapping ¼ lb. bricks, the shaft 134 will also be raised. During this movement the projections 142 and 149 will be disengaged from each other and the projections 143 and 147 will be brought into engaging relation to each other, the spring support of the collar 144 permitting a continuation of the upward movement of the shaft 134 after such interengagement of said projections 143 and 147.

The gear train between the rolls 73 and 74 includes change-speed gearing consisting of the pairs of gears 154—155, 156—157, and the counter-shaft 158, and sliding toothed clutch 159, the gears 155 and 157 having opposed toothed faces for engaging said clutch members 159, being operable by the rod 160.

The function of the change-speed gearing for the rolls 73 above described is to permit the operator to provide slack in the paper strips 67 and 68 between said rolls 73 and the rolls 74 and thereby prevent such a tension on said strips as would tend to tear them.

The foregoing description covers all of the main features of the several coordinated mechanisms of the machine, the obvious specific details of construction being, in the main, omitted from description.

Additionally to the mechanisms above described, the operation of the machine is controlled by a suitable clutch 161 manually operable by means of the lever 162, Fig. 4ª.

We claim:

1. In a wrapping machine, article and paper feed mechanisms and an article receiving and transferring carrier, said mechanisms arranged cooperatively to deposit an article on the carrier together with a sheet of paper partially wrapped about the article, folding mechanism for folding in the ends of a sheet wrapped around the article, said folding mechanism spaced from and disposed at a higher elevation than the feed mechanism, means in the transferring carrier for engaging the article during transfer to the folding mechanism, the latter including means for imparting an arcuate movement to the article during transfer, means associated with said transferring carrier for completing the wrapping of the sheet about the article, and means included in the folding mechanism for removing the article from the transferring carrier.

2. In a wrapping machine, article and paper feed mechanisms and an article receiving and transferring carrier, said mechanisms arranged cooperatively to deposit an article on the carrier together with a sheet of paper partially wrapped about the article, said transferring carrier including a platform pivotally movable through an arc of ninety degrees, folding mechanism for folding in the ends of a sheet wrapped around the article, said folding mechanism spaced from and disposed at a higher elevation than the feed mechanism, means in the transferring carrier for engaging the article during its pivotal movement, a device rigid with the frame of the machine cooperating with the pivotal movement of said platform to further wrap the paper about the article, an elevating device associated with said platform to remove the article from the latter as it completes its pivotal movement and deliver the same to the folding mechanism, and means included in the latter to complete the wrapping of the sheet about the article.

3. In a wrapping machine, a carrier for articles to be wrapped having a bottom plate and a rear plate, reciprocatory mechanism for feeding articles successively to said carrier with the front face of each thereof in contact with the said rear plate, mechanism for successively disposing wrapping sheets between said carrier and said mechanism in the path of each of the articles thereby to cause each of said sheets to become disposed between the rear and bottom plates of the carrier and the faces of the article opposed thereto, a hinged top plate for said carrier normally positioned out of the path of said sheet, and mechanism for swinging said carrier out of its normal position immediately following deposit of an article thereupon and effecting movement of said hinged plate to fold a part of said sheet to lie upon the top face of the article.

4. In a wrapping machine, a carrier for articles to be wrapped having a bottom plate and a rear plate, reciprocatory mechanism for feeding articles successively to said carrier with the front faces thereof in contact with the said rear plate, mechanism for successively disposing wrapping sheets between said carrier and said mechanism in the path of each of the articles to thereby cause each of said sheets to become disposed between the rear and bottom plates of the carrier and the faces of the article opposed thereto, a hinged top plate for said carrier, a spring for normally maintaining the same substantially parallel with the bottom plate, means for holding said hinged plate out of the path of the article and the wrapping sheet while said carrier is positioned to receive the latter, and mechanism for swinging said carrier out of its normal position and disengaging said top plate from said means to thereby fold said sheet into contact with the top face of the article.

5. In a wrapping machine, mechanism for intermittently feeding forward and slightly retracting a slab of material, mechanism for disposing a wrapper in the path of the front end of said slab, a support disposed to receive said front end portion of said slab with said wrapper, means for severing the front end portion of said slab from the body thereof prior to partial retraction of said slab, mechanism associated with said support for rotating the same following deposit thereon of the front end of said slab and severance of the latter, and means disposed for co-action with said last-named mechanism to dispose said wrapper around the said severed end portion of said slab.

6. In a wrapping machine, mechanism for intermittently feeding forward and slightly retracting a slab of material, mechanism for disposing a wrapper in the path of the front end of said slab, an L-shaped support disposed to receive said front end portion of said slab with said wrapper and cause the latter to hug the front and bottom faces of said front portion of the slab, means for severing the front end portion of said slab from the body thereof prior to partial retraction of said slab, mechanism associated with said support for rotating the same following deposit thereon of the front end of said slab and severance of the latter, and means disposed for co-action with said last-named mechanism to dispose said wrapper around the top, other side face and bottom face of said severed end portion of said slab.

7. In a wrapping machine, mechanism for intermittently feeding forward and slightly retracting a slab of material, mechanism for disposing a wrapper in the path of the front end of said slab, an L-shaped support adapted to receive said front end portion of said slab and the wrapper to cause the latter to hug the front and bottom faces thereof, means for severing the front end portion of said slab from the body thereof prior to partial retraction of said slab, mechanism associated with said support for rotating the same following deposit thereon of the front end of said slab and severance of the latter, and means disposed for co-action with said last-named mechanism to dispose said wrapper around the said severed end portion of said slab.

8. In a wrapping machine, mechanism for intermittently feeding forward and slightly retracting a slab of material, mechanism for disposing a wrapper in the path of the front end of said slab, an L-shaped support adapted to receive said front end portion of said slab and the wrapper to cause the latter to hug the front and bottom faces thereof, mechanism for rotating the said support on an axis parallel with the bottom face of the piece supported thereby, and means co-acting with said last-named mechanism for causing the said wrapper to hug the top, other side and bottom face of said piece during rotation of said support.

9. In a wrapping machine, mechanism for intermittently feeding forward and severing from a slab of material a piece to be wrapped, mechanism for disposing a wrapper in the path of the forward end of said slab preliminary to each forward movement thereof, an L-shaped support arranged to receive the front end portion of the slab prior to severance thereof and to receive said wrapper thereby to cause the latter to hug the front and bottom faces of said piece, a plate disposed to be moved into position parallel with the initial supporting surface of said support following deposit of said piece upon the latter, thereby to cause the wrapper to hug the top face of said piece, mechanism for rotating said support, and means arranged to engage the free portion of said wrapper during rotation of said support to cause said wrapper to hug the other side face of said piece.

10. In a wrapping machine, the combination with a support for articles to be wrapped, mechanism for disposing wrappers in front of said support, and reciprocable mechanism for successively projecting articles against said wrapper and upon said support, thereby partially to dispose said wrapper about the article, of mechanism for rotating said support with the article deposited thereon, means on said support for further disposing the wrapper about the article during rotation thereof, means disposed in the path of a still free portion of the wrapper for engagement by the latter during rotation of said support for still further disposing said wrapper about the article, a plunger arranged to receive the partially wrapped article from said support as the latter completes its rotary motion, a second plunger, means thereon for folding end portions of the wrapper partly against the ends of the article and remove the same from said first-named plunger, a chute adapted to receive the article from said second plunger, and means within said chute co-operating with said second plunger to complete the folding in of the end portions of the wrapper upon the ends of the article.

11. In a wrapping machine, the combination with mechanism for disposing a wrapper about the longitudinal surface of an article and comprising a rotatable support for the article, mechanism for rotating said support, mechanism for feeding wrappers in front of said support, mechanism for successively projecting articles against said wrappers and upon said support, thereby to dispose said wrapper partially about the article as the latter is deposited upon the support, and mechanism co-operating with said support during rotation of the latter to complete the disposal of the wrapper about the longitudinal surface of said article, of a chute through which the article is adapted to be passed, means within the chute for partially folding the end portions of the wrapper against the end faces of the article, a plunger arranged to remove the article from said support upon completion of its rotation, a second plunger equipped with means co-acting with the means in said chute for completing the folding of the end portions of the wrapper and removing the article from said first-named plunger and forcing the same into and through said chute.

12. A wrapping machine comprising a support for an article, means for successively feeding wrappers in front of said support, mechanism for projecting an article against said wrapper and upon said support, means on said support for causing the wrapper to be disposed in contact with a plurality of peripheral face portions of the article as the latter is deposited upon said support, mechanism for rotating said support, a wiper disposed in the path of free portion of the wrapper for disposing the latter in contact with exposed peripheral face portions of the article during rotation of said support, a plunger for elevating the article from said support as the latter completes its rotary motion, and a wiper disposed in the path of a still free portion of the wrapper during elevation of the article to complete the contact of said wrapper with the remaining exposed peripheral face portion of the article.

13. A wrapping machine comprising a support for an article, means for successively feeding wrappers in front of said support, mechanism for projecting an article against said wrapper and upon said support, means on said support for causing the wrapper to be disposed in contact with a plurality of peripheral face portions of the article as the latter is deposited upon said support, mechanism for rotating said support, a wiper disposed in the path of free portion of the wrapper for disposing the latter in contact with exposed peripheral face portions of the article, during rotation of said support, a plunger for elevating the article from said support as the latter completes its rotary motion, a second wiper disposed in the path of a still free portion of the wrapper during elevation of the article to complete the contact of said wrapper with the remaining exposed peripheral face portion of the article, and mechanism for removing the peripherally wrapped article from said plunger and folding the side edge portions of the wrapper against the ends of the article.

14. A machine for wrapping articles of rectangular cross-section, including mechanism for feeding said articles successively to a support, mechanism for successively disposing wrappers in the path of the articles, a support for receiving the articles and wrappers successively and equipped with a rear face and an overhanging member adapted for co-operation with the feeding mechanism to cause the wrapper to hug the bottom, top and front faces of the successive articles, mechanism for rotating said support, a plunger for removing the partially wrapped articles from said support as the latter completes its rotary movement, and a plurality of wipers disposed in the path of free portions of the wrapper during travel of the articles with said support and said plunger, respectively, for engaging said wrapper and disposing the same in contact with the remaining exposed peripheral face portions of the articles.

15. A machine for wrapping articles of rectangular cross-section, including mechanism for feeding said articles successively to a support, mechanism for successively disposing wrappers in the path of the articles, a support for receiving the articles and wrappers successively and equipped with a rear face, a supporting face and a spring-held clamping member opposed to said supporting face, said supporting and rear faces arranged to cause the wrapper to hug the bottom and front faces of the articles and said clamping member arranged to cause the wrapper to overhang the top faces of the articles, mechanism for rotating said support and cause said member to bring said wrapper into close contact with the top face of the article on said support and clamp said article upon the latter, a plunger for removing the partially wrapped articles from said support as the latter completes its rotary movement, and a plurality of wipers disposed in the path of free portions of the wrapper during travel of the articles with said support and said plunger, respectively, for engaging said wrapper and disposing the same in contact with the remaining exposed peripheral face portions of the articles.

16. A machine for wrapping articles of rectangular cross-section, including mechanism for feeding said articles successively to a support, mechanism for successively disposing wrappers in the path of the articles, a support for receiving the articles and wrappers successively and equipped with a rear face, a supporting face and a spring-held clamping member opposed to said supporting face, said supporting and rear faces arranged to cause the wrapper to hug the bottom and front faces of the articles and said clamping member arranged to cause the wrapper to overhang the top faces of the articles, mechanism for rotating said support and cause said member to bring said wrapper into close contact with the top face of the article on said support and clamp said article upon the latter, a plunger for removing the partially wrapped articles from said support as the latter completes its rotary movement, means for releasing said member from engagement with the article preparatory to engagement of the article by said plunger, and a plurality of wipers disposed in the path of free portions of the wrapper during travel of the articles with said support and said plunger, respectively, for engaging said wrapper and disposing the same in contact with the remaining exposed peripheral face portions of the articles.

17. A machine for wrapping articles of rectangular cross-section, including mechanism for feeding said articles successively to a support, mechanism for successively disposing wrappers in the path of the articles, a support for receiving the articles and wrappers successively and equipped with a rear face and an overhanging member adapted for co-operation with the feeding mechanism to cause the wrapper to hug the bottom, top, and front faces of the successive articles, mechanism for rotating said support through an arc of ninety degrees and shifting its position in the direction of the initial travel of the article, a plunger disposed to engage and remove the article from the said support as the latter completes the said rotary movement, and a plurality of wipers disposed in the path of free portions of the wrapper during travel of the articles with said support and said plunger, respectively, for engaging said wrapper and disposing the same in contact with the remaining exposed peripheral face portions of the articles.

18. A machine for wrapping articles of rectangular cross-section, including mechanism for feeding said articles successively to a support, mechanism for successively disposing wrappers in the path of the articles, a support for receiving the articles and wrappers successively and equipped with a rear face, a supporting face and a spring-urged clamping member overhanging said supporting face and initially disposed out of engaging relation to the article, said faces and member co-operating with said feed mechanism to cause the wrapper to become disposed over the bottom, front and top faces of the article, mechanism for rotating said support through an arc of ninety degrees, thereby to cause said member to engage the top face of the article and shift the position of said support to bring the supported article into the path of a plunger, a plunger for removing the partially wrapped articles from said support as the latter completes its rotary movement, and a plurality of wipers disposed in the path of free portions of the wrapper during travel of the articles with said support and said plunger, respectively, for engaging said wrapper and disposing the same in contact with the remaining exposed peripheral face portions of the articles.

19. A machine for wrapping articles of rectangular cross-section, including mechanism for feeding said articles successively to a support, mechanism for successively disposing wrappers in the path of the articles, a support for receiving the articles and wrappers successively and equipped with a rear face, a supporting face, and a spring-urged clamping member overhanging said supporting face and initially disposed out of engaging relation to the article, said faces and member co-operating with said feed mechanism to cause the wrapper to become disposed over the bottom, front and top faces of the article, mechanism for rotating said support through an arc of ninety degrees, thereby to cause said member to engage the top face of the article and shift the position of said support to bring the supported article into the path of a plunger, means for releasing said member from engagement with the article as said support completes said rotary movement, a plunger for removing the partially wrapped articles from said support as the latter completes its rotary movement, and a plurality of wipers disposed in the path of free portions of the wrapper during travel of the articles with said support and said plunger, respectively, for engaging said wrapper and disposing the same in contact with the remaining exposed peripheral face portions of the articles.

20. In a wrapping machine, a support adapted to receive and engage an article to be wrapped, an article feed mechanism disposed in front of said support, wrapper feed mechanism arranged to feed wrappers between said support and said feed mechanism, the latter projecting the article against the wrapper to carry the latter to said support, means on the latter for causing the wrapper to become disposed over the front, bottom and top portions of the article, a plunger disposed behind said support, mechanism for rotating and shifting the position of the said support, a wiper disposed to engage a free portion of the wrapper during rotation of said wrapper to dispose the latter to cover the rear face of the article, mechanism for effecting upward movement of said plunger as said support completes its rotary movement for raising the partially wrapped article from said support, and a second wiper disposed in the path of a still free portion of the wrapper for causing the same to overlap the portion thereof disposed upon the bottom portion of the article as said plunger rises.

CHARLES DOERING.
HENRY H. DOERING.
GEORGE ALSTAD.
BERTEL SKOGLUND.